US009912075B1

(12) United States Patent
Broyde et al.

(10) Patent No.: US 9,912,075 B1
(45) Date of Patent: Mar. 6, 2018

(54) METHOD FOR AUTOMATICALLY ADJUSTING TUNABLE PASSIVE ANTENNAS AND A TUNING UNIT, AND APPARATUS FOR RADIO COMMUNICATION USING THIS METHOD

(71) Applicant: TEKCEM, Maule (FR)

(72) Inventors: Frédéric Broyde, Maule (FR); Evelyne Clavelier, Maule (FR)

(73) Assignee: TEKCEM (FR)

( * ) Notice: Subject to any disclaimer, the term of this patent is extended or adjusted under 35 U.S.C. 154(b) by 0 days.

(21) Appl. No.: 15/697,005

(22) Filed: Sep. 6, 2017

Related U.S. Application Data

(63) Continuation of application No. PCT/IB2017/054531, filed on Jul. 26, 2017.

(30) Foreign Application Priority Data

Feb. 23, 2017 (FR) ...................................... 1770175

(51) Int. Cl.
*H01Q 21/06* (2006.01)
*H04B 7/0413* (2017.01)

(52) U.S. Cl.
CPC ............ *H01Q 21/06* (2013.01); *H04B 7/0413* (2013.01)

(58) Field of Classification Search
CPC .... H04B 7/0413; H01Q 21/06; H01Q 9/0442; H01Q 21/00
See application file for complete search history.

(56) References Cited

U.S. PATENT DOCUMENTS

| 8,063,839 | B2 | 11/2011 | Ansari et al. |
| 8,102,830 | B2 | 1/2012 | Yokoi et al. |
| 8,325,097 | B2 | 12/2012 | McKinzie, III et al. |
| 9,077,317 | B2 | 7/2015 | Broyde et al. |
| 9,621,132 | B2 | 4/2017 | Broyde et al. |
| 9,654,162 | B2 | 5/2017 | Broyde et al. |
| 9,680,510 | B2 | 6/2017 | Broyde et al. |
| 9,698,484 | B1 | 7/2017 | Broyde et al. |

(Continued)

FOREIGN PATENT DOCUMENTS

| FR | 2996067 A1 | 3/2014 |
| FR | 3018973 A1 | 9/2015 |

(Continued)

OTHER PUBLICATIONS

Broyde et al, "Some Properties of Multiple-Antenna-Port and Multiple-User-Port Antenna Tuners", IEEE Trans. on Circuits and Systems—I: Regular Papers, vol. 62, No. 2, pp. 423-432, Feb. 2015.

(Continued)

*Primary Examiner* — Dameon E Levi
*Assistant Examiner* — David Lotter
(74) *Attorney, Agent, or Firm* — Barnes & Thornburg LLP

(57) ABSTRACT

The invention relates to a method for automatically adjusting a plurality of tunable passive antennas and a multiple-input-port and multiple-output-port tuning unit. The invention also relates to an apparatus for radio communication using this method. An apparatus for radio communication of the invention comprises: 4 tunable passive antennas; a multiple-input-port and multiple-output-port tuning unit having 4 input ports and 4 output ports; 4 sensing units; 4 feeders; a transmission and signal processing unit, which applies 4 excitations to the input ports, one and only one of the excitations being applied to each of the input ports, and which delivers one or more antenna adjustment instructions and one or more tuning unit adjustment instructions; and a control unit, which delivers one or more antenna control signals to the tunable passive antennas, and which delivers one or more tuning control signals to the multiple-input-port and multiple-output-port tuning unit.

20 Claims, 10 Drawing Sheets

(56) References Cited

U.S. PATENT DOCUMENTS

2015/0372656 A1* 12/2015 Mow .................. H03H 7/38
    455/77
2016/0043751 A1  2/2016 Broyde et al.
2017/0040704 A1  2/2017 Broyde et al.
2017/0063344 A1  3/2017 Broyde et al.

FOREIGN PATENT DOCUMENTS

| FR | 3021813 A1 | 12/2015 |
|---|---|---|
| WO | WO 2014/049475 A2 | 4/2014 |
| WO | WO2015/140660 A1 | 9/2015 |
| WO | WO2015/181653 A1 | 12/2015 |

OTHER PUBLICATIONS

Broyde et al, "A New Multiple-Antenna-Port and Multiple-User-Port Antenna Tuner", proceedings of the 2015 IEEE Radio & Wireless Week, RWW 2015, Jan. 2015.

Broyde et al, "Two Multiple-Antenna-Port and Multiple-User-Port Antenna Tuners", proceedings of the 9th European Conference on Antenna and Propagation, EuCAP 2015, Apr. 2015.

Broyde et al., "A Tuning Computation Technique for a Multiple-Antenna-Port and Multiple-User-Port Antenna Tuner", International Journal of Antennas and Propagation, 2016.

"IEC Multilingual Dictionary of Electricity", Bureau Central de la Commission Electrotechnique Internationale, 1983.

Petosa, "An Overview of Tuning Techniques for Frequency-Agile Antennas", IEEE Antennas and Propagation Magazine, vol. 54, No. 5, pp. 271-296, Oct. 2012.

International Search Report relating to PCT/IB2017/054531, dated Nov. 14, 2017.

Information on Search Strategy relating to PCT/IB2017/054531, dated Nov. 14, 2017.

Written Opinion relating to PCT/IB2017/054531, dated Nov. 14, 2017.

* cited by examiner

METHOD FOR AUTOMATICALLY ADJUSTING TUNABLE PASSIVE ANTENNAS AND A TUNING UNIT, AND APPARATUS FOR RADIO COMMUNICATION USING THIS METHOD

CROSS REFERENCE TO RELATED APPLICATIONS

This is a Continuation Application of PCT application No. PCT/IB2017/054531, filed 26 Jul. 2017, entitled "Method for automatically adjusting tunable passive antennas and a tuning unit, and apparatus for radio communication using this method", which in turn claims priority to French patent application No. FR1770175 of 23 Feb. 2017, entitled "Procédépour régler automatiquement des antennes passives accordables et une unité d'accord, et appareil pour communication radio utilisant ce procédé", both of which are incorporated herein by reference.

FIELD OF THE INVENTION

The invention relates to a method for automatically adjusting a plurality of tunable passive antennas and a multiple-input-port and multiple-output-port tuning unit, for instance a plurality of tunable passive antennas and a multiple-input-port and multiple-output-port tuning unit of a radio transmitter using several antennas simultaneously. The invention also relates to an apparatus for radio communication using this method, for instance a radio transceiver.

PRIOR ART

In what follows, in line with the "IEC multilingual dictionary of electricity" edited by the *Bureau Central de la Commission Electrotechnique Internationale* in 1983, "open-loop control" means control which does not utilize a measurement of the controlled variable, and "closed-loop control" (which is also referred to as "feedback control") means control in which the control action is made to depend on a measurement of the controlled variable.

A tunable passive antenna comprises at least one antenna control device having at least one parameter having an effect on one or more characteristics of said tunable passive antenna, said at least one parameter being adjustable, for instance by electrical means. Adjusting a tunable passive antenna means adjusting at least one said at least one parameter. Each of said one or more characteristics may for instance be an electrical characteristic such as an impedance at a specified frequency, or an electromagnetic characteristic such as a directivity pattern at a specified frequency. A tunable passive antenna may also be referred to as "reconfigurable antenna". Some authors consider three classes of tunable passive antennas: polarization-agile antennas, pattern-reconfigurable antennas and frequency-agile antennas. The state of the art regarding frequency-agile antennas is for instance described in the article of A. Petosa entitled "An Overview of Tuning Techniques for Frequency-Agile Antennas", published in *IEEE Antennas and Propagation Magazine*, vol. 54, No. 5, in October 2012. As explained in this article, many different types of antenna control device may be used to control one or more characteristics of a tunable passive antenna. An antenna control device may for instance be:

an electrically controlled switch or change-over switch, in which case a parameter of the antenna control device having an effect on one or more characteristics of the tunable passive antenna may be the state of the switch or change-over switch;

an adjustable impedance device, in which case a parameter of the antenna control device having an effect on one or more characteristics of the tunable passive antenna may be the reactance or the impedance of the adjustable impedance device at a specified frequency; or an actuator arranged to produce a mechanical deformation of the tunable passive antenna, in which case a parameter of the antenna control device having an effect on one or more characteristics of the tunable passive antenna may be a length of the deformation.

If an antenna control device is an electrically controlled switch or change-over switch, it may for instance be an electro-mechanical relay, or a microelectromechanical switch (MEMS switch), or a circuit using one or more PIN diodes or one or more insulated-gate field-effect transistors (MOSFETs) as switching devices.

An adjustable impedance device is a component comprising two terminals which substantially behave as the terminals of a passive linear two-terminal circuit element, and which are consequently characterized by an impedance which may depend on frequency, this impedance being adjustable.

An adjustable impedance device having a reactance which is adjustable by electrical means may be such that it only provides, at a given frequency, a finite set of reactance values, this characteristic being for instance obtained if the adjustable impedance device is:

a network comprising a plurality of capacitors or open-circuited stubs and one or more electrically controlled switches or change-over switches, such as electro-mechanical relays, or microelectromechanical switches, or PIN diodes or insulated-gate field-effect transistors, used to cause different capacitors or open-circuited stubs of the network to contribute to the reactance; or a network comprising a plurality of coils or short-circuited stubs and one or more electrically controlled switches or change-over switches used to cause different coils or short-circuited stubs of the network to contribute to the reactance.

An adjustable impedance device having a reactance which is adjustable by electrical means may be such that it provides, at a given frequency, a continuous set of reactance values, this characteristic being for instance obtained if the adjustable impedance device is based on the use of a variable capacitance diode; or a MOS varactor; or a microelectromechanical varactor (MEMS varactor); or a ferroelectric varactor.

Many methods exist for automatically adjusting a single tunable passive antenna, for instance the methods disclosed in U.S. Pat. No. 8,063,839 entitled "Tunable antenna system", and in U.S. Pat. No. 8,325,097 entitled "Adaptively tunable antennas and method of operation therefore". Such methods cannot be used for automatically adjusting a plurality of tunable passive antennas, when the interactions between the tunable passive antennas are not negligible.

A first method for automatically adjusting a plurality of tunable passive antennas is disclosed in the patent of the U.S. Pat. No. 8,102,830 entitled "MIMO Radio Communication Apparatus and Method", in which each tunable passive antenna comprises a main antenna which is connected to the signal port of said each tunable passive antenna, and two or more auxiliary antennas. Each of the auxiliary antennas is connected to an adjustable impedance device, each of the adjustable impedance devices having a reactance which is adjustable by electrical means. Each of the tunable passive antennas may be regarded as a pattern-reconfigurable antenna. This first method is only applicable to a radio receiver using several antennas simultaneously for MIMO radio reception.

A second method for automatically adjusting a plurality of tunable passive antennas may be derived from the approach employed in the patent of the U.S. Pat. No. 9,077,317, entitled "Method and apparatus for automatically tuning an impedance matrix, and radio transmitter using this apparatus", which discloses a method for automatically adjusting a multiple-input-port and multiple-output-port tuning unit, using different excitations applied successively. This second method is applicable to a radio transmitter using a plurality of antennas simultaneously. This second method may be used when the interactions between the tunable passive antennas are not negligible. A block diagram of an automatic antenna system implementing this second method is shown in FIG. 1. The automatic antenna system shown in FIG. 1 has m=4 user ports (311) (321) (331) (341), the m user ports presenting, at a given frequency, an impedance matrix referred to as "the impedance matrix presented by the user ports", the automatic antenna system comprising:

- m=4 tunable passive antennas (11) (12) (13) (14), them tunable passive antennas operating simultaneously in a given frequency band, the m tunable passive antennas forming a multiport antenna array (1), each of the tunable passive antennas comprising at least one antenna control device, one or more characteristics of said each of the tunable passive antennas being controlled by utilizing said at least one antenna control device, said at least one antenna control device having at least one parameter having an effect on said one or more characteristics, said at least one parameter being adjustable by electrical means;
- m sensing units (31) (32) (33) (34), each of the sensing units delivering two "sensing unit output signals", each of the sensing unit output signals being determined by one electrical variable sensed (or measured) at one of the user ports;
- m feeders (21) (22) (23) (24), each of the feeders having a first end coupled to a signal port of one and only one of the tunable passive antennas, each of the feeders having a second end coupled to one and only one of the user ports, through one and only one of the sensing units;
- a signal processing unit (5), the signal processing unit estimating q real quantities depending on the impedance matrix presented by the user ports, where q is an integer greater than or equal to m, using the sensing unit output signals caused by m different excitations applied successively to the user ports, the signal processing unit delivering an "adjustment instruction" as a function of said q real quantities depending on the impedance matrix presented by the user ports; and
- a control unit (6), the control unit receiving the adjustment instruction from the signal processing unit (5), the control unit delivering "control signals", the control signals being mainly determined as a function of the adjustment instruction, each of said parameters being mainly determined by one or more of the control signals.

Unfortunately, it was found that tunable passive antennas often only provide a poor tuning capability, so that it is often not possible to obtain that the automatic antenna system shown in FIG. 1 can sufficiently reduce or cancel any variation in the impedance matrix presented by the user ports, caused by a variation in a frequency of operation, and/or caused by the well-known user interaction.

This problem is solved in a method for automatically adjusting a plurality of tunable passive antennas and a multiple-input-port and multiple-output-port tuning unit, disclosed in the French patent application No. 14/00666 of 20 Mar. 2014 and in the PCT application No. PCT/IB2015/051644 of 6 Mar. 2015 (WO 2015/140660). This method is applicable to a radio receiver using a plurality of antennas simultaneously and to a radio transmitter using a plurality of antennas simultaneously. This method may be used when the interactions between the tunable passive antennas are not negligible. In particular, the ninth embodiment of the French patent application No. 14/00666 and of the PCT application No. PCT/IB2015/051644 discloses a variant of this method, which is applicable to a radio transmitter. A block diagram of an automatic antenna system implementing this variant of this method is shown in FIG. 2. The automatic antenna system shown in FIG. 2 has m=4 user ports (311) (321) (331) (341), the m user ports presenting, at a given frequency, an impedance matrix referred to as "the impedance matrix presented by the user ports", the automatic antenna system comprising:

- n=4 tunable passive antennas (11) (12) (13) (14), then tunable passive antennas operating simultaneously in a given frequency band, the n tunable passive antennas forming a multiport antenna array (1), each of the tunable passive antennas comprising at least one antenna control device, one or more characteristics of said each of the tunable passive antennas being controlled by utilizing said at least one antenna control device, said at least one antenna control device having at least one parameter having an effect on said one or more characteristics, said at least one parameter being adjustable by electrical means;
- m sensing units (31) (32) (33) (34), each of the sensing units delivering two "sensing unit output signals", each of the sensing unit output signals being determined by one electrical variable sensed (or measured) at one of the user ports;
- a multiple-input-port and multiple-output-port tuning unit (4) having m input ports and n output ports, each of the input ports being coupled to one and only one of the user ports through one and only one of the sensing units, the multiple-input-port and multiple-output-port tuning unit comprising p adjustable impedance devices, where p is an integer greater than or equal to m, the p adjustable impedance devices being referred to as "the adjustable impedance devices of the tuning unit" and being such that, at said given frequency, each of the adjustable impedance devices of the tuning unit has a reactance, the reactance of any one of the adjustable impedance devices of the tuning unit being adjustable by electrical means;
- n feeders (21) (22) (23) (24), each of the feeders having a first end coupled to a signal port of one and only one of the tunable passive antennas, each of the feeders having a second end coupled to one and only one of the output ports;
- a signal processing unit (5), the signal processing unit estimating q real quantities depending on the impedance matrix presented by the user ports, where q is an integer greater than or equal to m, using the sensing unit output signals caused by m different excitations applied successively to the user ports, the signal processing unit delivering an "adjustment instruction" as a function of said q real quantities depending on the impedance matrix presented by the user ports; and a control unit (6), the control unit receiving the adjustment instruction from the signal processing unit (5), the control unit delivering "control signals", the control signals being determined as a function of the adjustment instruction, the reactance of each of the adjustable impedance devices of the tuning unit being mainly determined by one or more of the control signals, each of said parameters being mainly determined by one or more of the control signals.

This variant of this method may provide an excellent tuning capability. Unfortunately, it can be shown that an adjustment of the multiple-input-port and multiple-output-port tuning unit obtained using this variant of this method is typically not close to an optimal adjustment, when the losses in the multiple-input-port and multiple-output-port tuning unit are not very small.

Consequently, there is no known solution to the problem of automatically adjusting the plurality of tunable passive antennas coupled to a radio transmitter used for MIMO wireless communication, in a manner that provides: a good tuning capability, by utilizing a multiple-input-port and multiple-output-port tuning unit; and an adjustment of the multiple-input-port and multiple-output-port tuning unit which is close to an optimal adjustment, when its losses are not very small.

SUMMARY OF THE INVENTION

The purpose of the invention is a method for automatically adjusting a plurality of tunable passive antennas and a multiple-input-port and multiple-output-port tuning unit, without the above-mentioned limitations of known techniques, and also an apparatus for radio communication using this method.

In what follows, X and Y being different quantities or variables, performing an action as a function of X does not preclude the possibility of performing this action as a function of Y. In what follows, "having an influence" and "having an effect" have the same meaning. In what follows, "coupled", when applied to two ports (in the meaning of circuit theory), may indicate that the ports are directly coupled, in which case each terminal of one of the ports is connected to (or, equivalently, in electrical contact with) one and only one of the terminals of the other port, and/or that the ports are indirectly coupled, in which case an electrical interaction different from direct coupling exists between the ports, for instance through one or more components.

The method of the invention is a method for automatically adjusting N tunable passive antennas and a multiple-input-port and multiple-output-port tuning unit, where N is an integer greater than or equal to 2, the multiple-input-port and multiple-output-port tuning unit having m input ports and n output ports, where m and n are each an integer greater than or equal to 2, the tunable passive antennas and the multiple-input-port and multiple-output-port tuning unit being parts of an apparatus for radio communication, the apparatus for radio communication allowing, at a given frequency, a transfer of power from the m input ports to an electromagnetic field radiated by the tunable passive antennas, the method comprising the steps of:

applying m excitations to the m input ports, one and only one of the excitations being applied to each of the input ports;

estimating q real quantities depending on an impedance matrix seen by the output ports, where q is an integer greater than or equal to m, by utilizing said m excitations;

generating one or more "antenna control signals", as a function of one or more of said q real quantities depending on an impedance matrix seen by the output ports, each of the tunable passive antennas comprising at least one antenna control device, one or more characteristics of said each of the tunable passive antennas being controlled by utilizing said at least one antenna control device, said at least one antenna control device having at least one parameter having an influence on said one or more characteristics, said at least one parameter being adjustable by electrical means, said at least one parameter being mainly determined by at least one of the one or more antenna control signals; and generating one or more "tuning control signals", as a function of at least m of said q real quantities depending on an impedance matrix seen by the output ports, the multiple-input-port and multiple-output-port tuning unit comprising p adjustable impedance devices, where p is an integer greater than or equal to m, the p adjustable impedance devices being referred to as "the adjustable impedance devices of the tuning unit" and being such that, at the given frequency, each of the adjustable impedance devices of the tuning unit has a reactance, the reactance of any one of the adjustable impedance devices of the tuning unit being adjustable by electrical means, the reactance of any one of the adjustable impedance devices of the tuning unit being mainly determined by at least one of the one or more tuning control signals, the reactance of any one of the adjustable impedance devices of the tuning unit having an influence on an impedance matrix presented by the input ports.

The given frequency may for instance be a frequency greater than or equal to 150 kHz. The specialist understands that the impedance matrix seen by the output ports is a complex matrix of size n by n, and that the impedance matrix presented by the input ports is a complex matrix of size m by m. We will use $Z_{Sant}$ to denote the impedance matrix seen by the output ports, and $Z_U$ to denote the impedance matrix presented by the input ports.

Each of the N tunable passive antennas has a port, referred to as the "signal port" of the antenna, which can be used to receive and/or to emit electromagnetic waves. Each of the tunable passive antennas comprises at least one antenna control device, which may comprise one or more terminals used for other electrical connections. It is assumed that each of the tunable passive antennas behaves, at the given frequency, with respect to the signal port of the antenna, substantially as a passive antenna, that is to say as an antenna which is linear and does not use an amplifier for amplifying signals received by the antenna or signals emitted by the antenna. As a consequence of linearity, it is possible to define an impedance matrix presented by the tunable passive antennas, the definition of which only considers, for each of the tunable passive antennas, the signal port of the antenna. This matrix is consequently of size N×N. Because of the interactions between the tunable passive antennas, this matrix need not be diagonal. In particular, the invention may for instance be such that this matrix is not a diagonal matrix.

As said above in the prior art section, each of said one or more characteristics may for instance be an electrical characteristic such as an impedance at a specified frequency, or an electromagnetic characteristic such as a directivity pattern at a specified frequency.

It is said above that the apparatus for radio communication allows, at the given frequency, a transfer of power from the m input ports to an electromagnetic field radiated by the tunable passive antennas. In other words, the apparatus for radio communication is such that, if a power is received by the m input ports at the given frequency, a part of said power received by the m input ports is transferred to an electromagnetic field radiated by the tunable passive antennas at the given frequency, so that a power of the electromagnetic field radiated by the tunable passive antennas at the given frequency is equal to said part of said power received by them input ports. For instance, the specialist knows that a power of the electromagnetic field radiated by the tunable passive antennas (average radiated power) can be computed as the flux of the real part of a complex Poynting vector of the electromagnetic field radiated by the tunable passive antennas, through a closed surface containing the tunable passive antennas.

To obtain that the apparatus for radio communication allows, at the given frequency, a transfer of power from the m input ports to an electromagnetic field radiated by the tunable passive antennas, as shown below in the first embodiment, each of the tunable passive antennas may, if n=N, for instance be coupled, directly or indirectly, to one and only one of the output ports. More precisely, if n=N, for each of the tunable passive antennas, the signal port of the antenna may for instance be coupled, directly or indirectly, to one and only one of the output ports. For instance, an indirect coupling may be a coupling through a feeder and/or through a sensing unit. For suitable values of the tuning control signals and of the antenna control signals, said transfer of power from them input ports to an electromagnetic field radiated by the tunable passive antennas may for instance be a transfer of power with small or negligible or zero losses, this characteristic being preferred.

As explained below in the presentations of the second and third embodiments, said m excitations can be used to estimate the q real quantities depending on an impedance matrix seen by the output ports.

According to the invention, each of said q real quantities depending on an impedance matrix seen by the output ports may for instance be a real quantity representative of the impedance matrix seen by the output ports.

According to the invention, each of said q real quantities depending on an impedance matrix seen by the output ports may for instance be substantially proportional to the absolute value, or the phase, or the real part, or the imaginary part of an entry of the impedance matrix seen by the output ports, or of an entry of the inverse of the impedance matrix seen by the output ports (that is, the admittance matrix seen by the output ports), or of an entry of a matrix of the voltage reflection coefficients at the output ports, defined as being equal to $(Z_{Sant}-Z_O)(Z_{Sant}+Z_O)^{-1}$, where $Z_O$ is a reference impedance matrix.

The specialist sees a fundamental difference between the prior art method disclosed in said ninth embodiment of the French patent application No. 14/00666 and of the PCT application No. PCT/IB2015/051644, implemented in the automatic antenna system shown in FIG. 2, on the one part, and the invention, on the other part. In said prior art method, real quantities depending on the impedance matrix presented by the user ports are used for automatically adjusting the impedance matrix presented by the user ports. This means that said prior art method uses a closed-loop control scheme, in which the real quantities depending on the impedance matrix presented by the user ports are used to obtain control signals, which determine the reactance of each of the adjustable impedance devices of the tuning unit, and therefore determine the impedance matrix presented by the user ports. In contrast, the method of the invention uses an open-loop control scheme to obtain the one or more tuning control signals, because at least m of the q real quantities depending on an impedance matrix seen by the output ports are used to obtain the one or more tuning control signals, the one or more tuning control signals having an influence on the reactance of each of the adjustable impedance devices of the tuning unit, the one or more tuning control signals having no influence on the impedance matrix seen by the output ports.

The section III of the article of F. Broydé and E. Clavelier entitled "Some Properties of Multiple-Antenna-Port and Multiple-User-Port Antenna Tuners", published in *IEEE Trans. on Circuits and Systems—I: Regular Papers*, Vol. 62, No. 2, pp. 423-432, in February 2015, explains that there exists a mapping denoted by $f_U$ and defined by $$f_U(Z_{Sant}, X_1, \ldots, X_p) = Z_U \tag{1}$$

where, the adjustable impedance devices of the tuning unit being numbered from 1 to p, for any integer j greater than or equal to 1 and less than or equal to p, we use $X_j$ to denote the reactance of the adjustable impedance device of the tuning unit number j, at the given frequency. Here, $Z_{Sant}$ is of course independent of the real variables $X_1, \ldots, X_p$, whereas the equation (1) shows that $Z_U$ depends on the real variables $X_1, \ldots, X_p$. This allows us to clarify said fundamental difference between said prior art method and the invention, in both of which each of the real variables $X_1, \ldots, X_p$ is mainly determined by at least one of the "control signals" or "tuning control signals". Said prior art method uses a closed-loop control scheme because it is such that real quantities depending on $Z_U$ are used to obtain control signals and consequently to determine the real variables $X_1, \ldots, X_p$, and thus to modify $Z_U$ according to equation (1). In contrast, the invention uses an open-loop control scheme to obtain the one or more tuning control signals, because real quantities depending on $Z_{Sant}$ are used to obtain tuning control signals and consequently to determine the real variables $X_1, \ldots, X_p$, which have no influence on $Z_{Sant}$.

According to the invention, since real quantities depending on $Z_{Sant}$ are used to obtain the tuning control signals and consequently to determine the real variables $X_1, \ldots X_p$, the equation (1) indicates that the tuning control signals can be used to control $Z_U$, if the mapping $f_U$ is known. More generally, the tuning control signals can be used to control $Z_U$, using a suitable model of the multiple-input-port and multiple-output-port tuning unit. Thus, according to the invention, it is possible that the tuning control signals are such that the impedance matrix presented by the input ports, computed using the equation (1), decreases or minimizes a norm of the image of the impedance matrix presented by the input ports under a matrix function, the matrix function being a function from a set of square complex matrices into the same set of square complex matrices. For instance, this norm may be a vector norm or a matrix norm. For instance, if we define a wanted impedance matrix, the wanted impedance matrix being denoted by $Z_W$, said matrix function may be denoted by g and defined by $$g(Z_U) = Z_U - Z_W \tag{2}$$

in which case the image of $Z_U$ under the matrix function is a difference of impedance matrices, or by $$g(Z_U) = Z_U^{-1} - Z_W^{-1} \tag{3}$$

in which case the image of $Z_U$ under the matrix function is a difference of admittance matrices, or by $$g(Z_U) = (Z_U - Z_W)(Z_U + Z_W)^{-1} \tag{4}$$

in which case the image of $Z_U$ under the matrix function is a matrix of the voltage reflection coefficients at the input ports. We note that each of these matrix functions is such that $g(Z_W)$ is a null matrix, so that the norm of $g(Z_W)$ is zero.

The specialist understands that the one or more antenna control signals have an effect on each of said parameters, so that they may have an influence on the impedance matrix seen by the output ports, and on the impedance matrix presented by the input ports. In the previous sentence, "each of said parameters" clearly means "each said at least one parameter of each said at least one antenna control device of each of the tunable passive antennas".

It was explained above that, in the method of the invention, open-loop control is utilized to generate the one or more tuning control signals. In contrast, the method of the invention may for instance be such that it uses a closed-loop control scheme to obtain the one or more antenna control signals, because one or more of said q real quantities depending on an impedance matrix seen by the output ports are used to obtain the one or more antenna control signals, the one or more antenna control signals having an influence on each of said parameters, so that the one or more antenna control signals may for instance have an influence on the impedance matrix seen by the output ports.

The method of the invention may for instance be such that any diagonal entry of the impedance matrix presented by the input ports is influenced by the reactance of at least one of the adjustable impedance devices of the tuning unit. The method of the invention may for instance be such that the reactance of at least one of the adjustable impedance devices of the tuning unit has an influence on at least one non-diagonal entry of the impedance matrix presented by the input ports. The specialist understands that this characteristic avoids the poor tuning capability mentioned above in the prior art section.

An apparatus implementing the method of the invention is an apparatus for radio communication comprising:

N tunable passive antennas, where N is an integer greater than or equal to 2, each of the tunable passive antennas comprising at least one antenna control device, one or more characteristics of said each of the tunable passive antennas being controlled by utilizing said at least one antenna control device, said at least one antenna control device having at least one parameter having an influence on said one or more characteristics, said at least one parameter being adjustable by electrical means;

a multiple-input-port and multiple-output-port tuning unit having m input ports and n output ports, where m and n are each an integer greater than or equal to 2, the apparatus for radio communication allowing, at a given frequency, a transfer of power from the m input ports to an electromagnetic field radiated by the tunable passive antennas, the multiple-input-port and multiple-output-port tuning unit comprising p adjustable impedance devices, where p is an integer greater than or equal to m, the p adjustable impedance devices being referred to as "the adjustable impedance devices of the tuning unit" and being such that, at the given frequency, each of the adjustable impedance devices of the tuning unit has a reactance, the reactance of any one of the adjustable impedance devices of the tuning unit being adjustable by electrical means, the reactance of any one of the adjustable impedance devices of the tuning unit having an influence on an impedance matrix presented by the input ports;

n sensing units, each of the sensing units delivering one or more "sensing unit output signals", each of the sensing unit output signals being mainly determined by one or more electrical variables;

a transmission and signal processing unit, the transmission and signal processing unit applying m excitations to the m input ports, one and only one of the excitations being applied to each of the input ports, the transmission and signal processing unit estimating q real quantities depending on an impedance matrix seen by the output ports, where q is an integer greater than or equal to m, by utilizing the sensing unit output signals caused by said m excitations, the transmission and signal processing unit delivering one or more "antenna adjustment instructions", the one or more antenna adjustment instructions being determined as a function of one or more of said q real quantities depending on an impedance matrix seen by the output ports, the transmission and signal processing unit delivering one or more "tuning unit adjustment instructions", the one or more tuning unit adjustment instructions being determined as a function of at least m of said q real quantities depending on an impedance matrix seen by the output ports; and a control unit, the control unit delivering one or more "antenna control signals" to the tunable passive antennas, each of the one or more antenna control signals being determined as a function of at least one of the one or more antenna adjustment instructions, each of said parameters being mainly determined by at least one of the one or more antenna control signals, the control unit delivering one or more "tuning control signals" to the multiple-input-port and multiple-output-port tuning unit, each of the one or more tuning control signals being determined as a function of at least one of the one or more tuning unit adjustment instructions, the reactance of each of the adjustable impedance devices of the tuning unit being mainly determined by at least one of the one or more tuning control signals.

In the previous sentence, "each of said parameters" clearly means "each said at least one parameter of each said at least one antenna control device of each of the tunable passive antennas".

For instance, each of said electrical variables may be a voltage, or an incident voltage, or a reflected voltage, or a current, or an incident current, or a reflected current. For instance, each of said electrical variables may be sensed (or measured) at one of said output ports, or inside the multiple-input-port and multiple-output-port tuning unit.

As explained above, if n=N, it is for instance possible that each of the tunable passive antennas is coupled, directly or indirectly, to one and only one of the output ports. As explained above, if n=N, it is for instance possible that, for each of the tunable passive antennas, the signal port of the antenna is coupled, directly or indirectly, to one and only one of the output ports. Thus, said transfer of power (from the m input ports to an electromagnetic field radiated by the tunable passive antennas) may take place through the multiple-input-port and multiple-output-port tuning unit. The integer p may be greater than or equal to 2m.

It is for instance possible that each of the m input ports is coupled, directly or indirectly, to a port of the transmission and signal processing unit, said port of the transmission and signal processing unit delivering one and only one of the excitations.

Said multiple-input-port and multiple-output-port tuning unit comprises m input ports and n output ports. It is assumed that said multiple-input-port and multiple-output-port tuning unit behaves, at said given frequency, with respect to its input ports and output ports, substantially as a passive linear device, where "passive" is used in the meaning of circuit theory. More precisely, said multiple-input-port and multiple-output-port tuning unit behaves, at said given frequency, with respect to the n output ports and the m input ports, substantially as a passive linear (n+m)-port device. As a consequence of linearity, it is possible to define the impedance matrix presented by the input ports. As a consequence of passivity, the multiple-input-port and multiple-output-port tuning unit does not provide amplification.

The specialist understands that the apparatus for radio communication of the invention is adaptive in the sense that said parameters and the reactances of the adjustable impedance devices of the tuning unit are varied with time as a function of the sensing unit output signals, which are each mainly determined by one or more electrical variables.

BRIEF DESCRIPTION OF THE DRAWINGS

Other advantages and characteristics will appear more clearly from the following description of particular embodiments of the invention, given by way of non-limiting examples, with reference to the accompanying drawings in which.

DETAILED DESCRIPTION OF SOME EMBODIMENTS

First Embodiment

Figure 1:
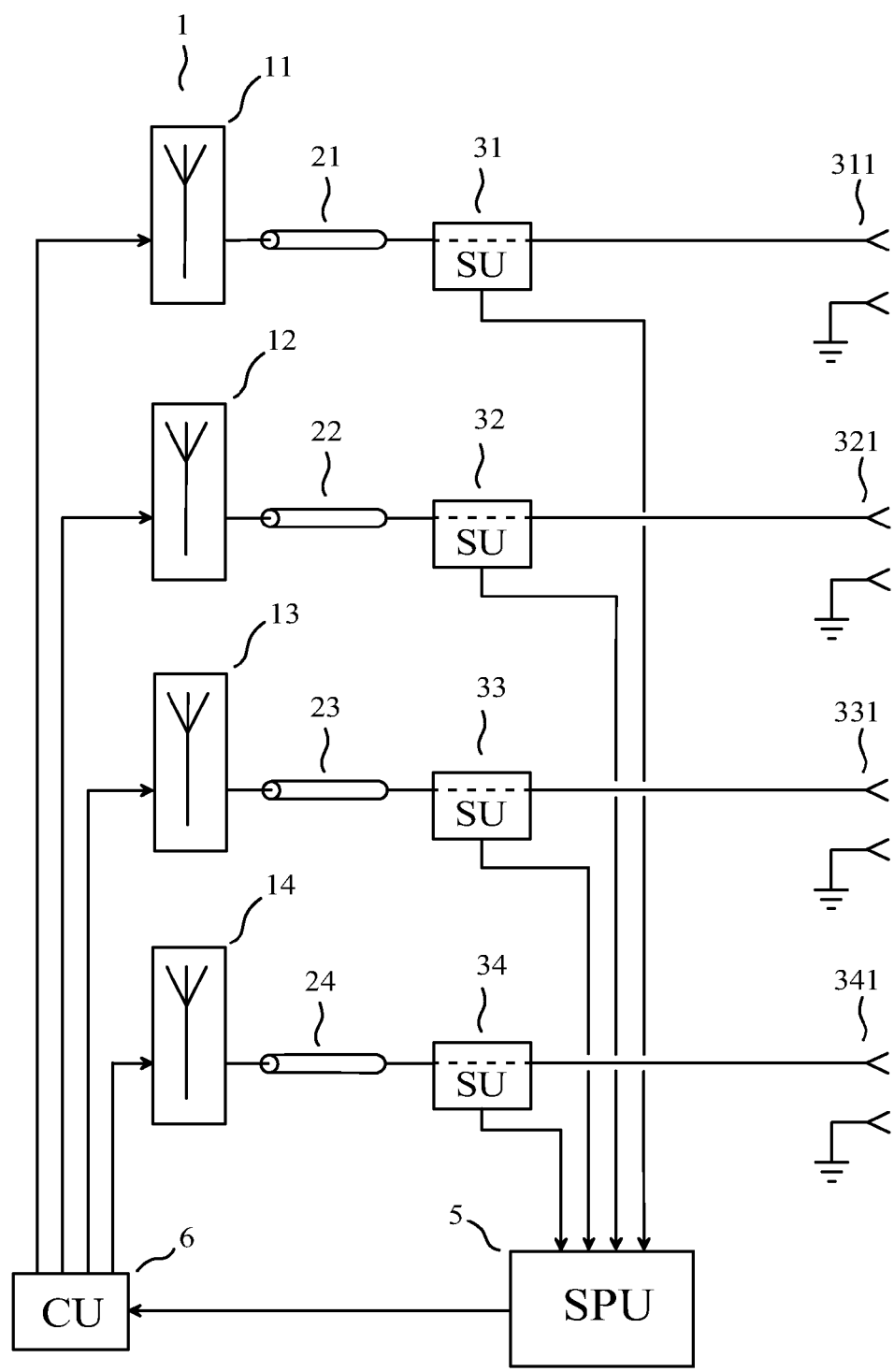
FIG. 1 shows a block diagram of an automatic antenna system, and has already been discussed in the section dedicated to the presentation of the prior art.
Figure 2:
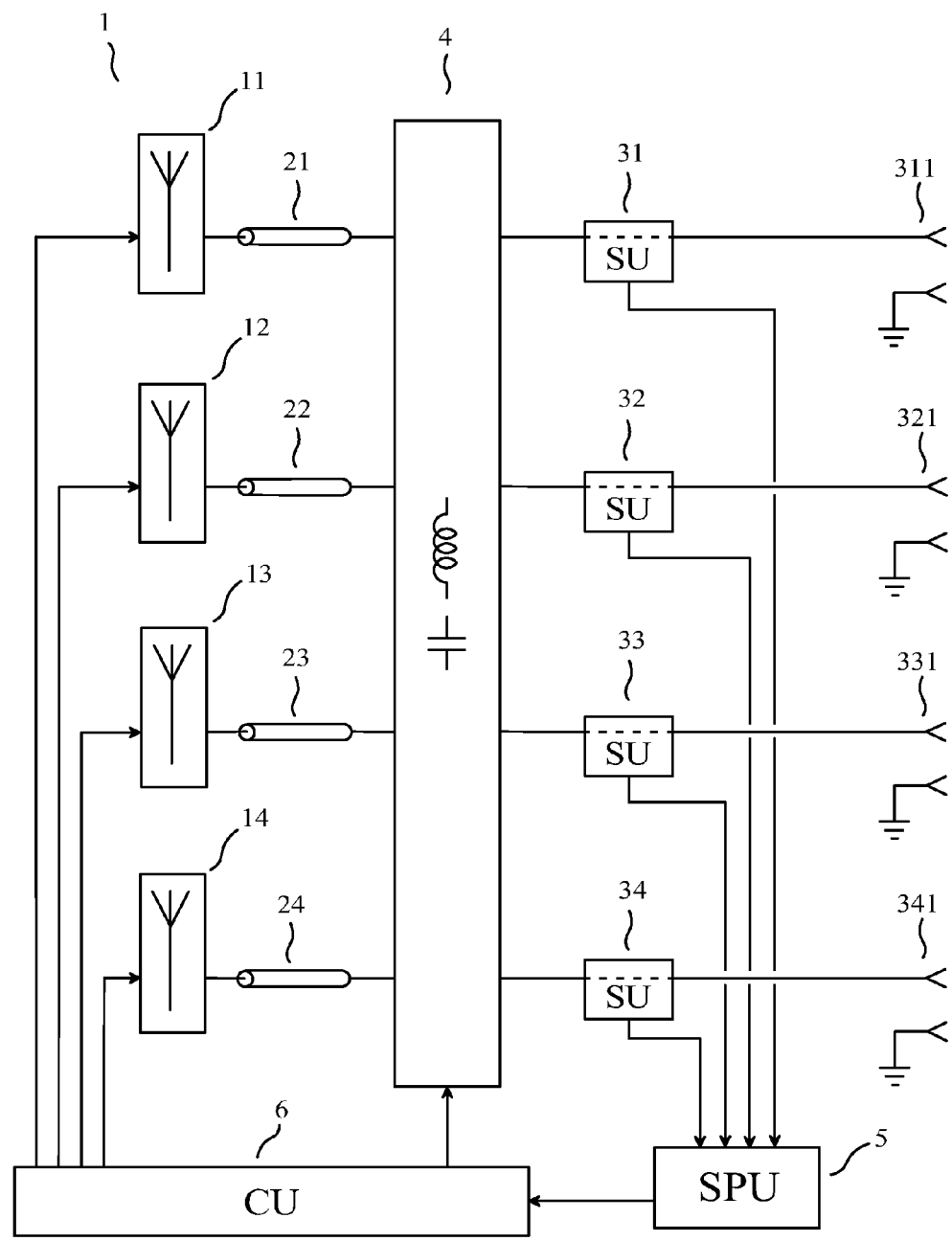
FIG. 2 shows a block diagram of an automatic antenna system, and has already been discussed in the section dedicated to the presentation of the prior art.
Figure 3:
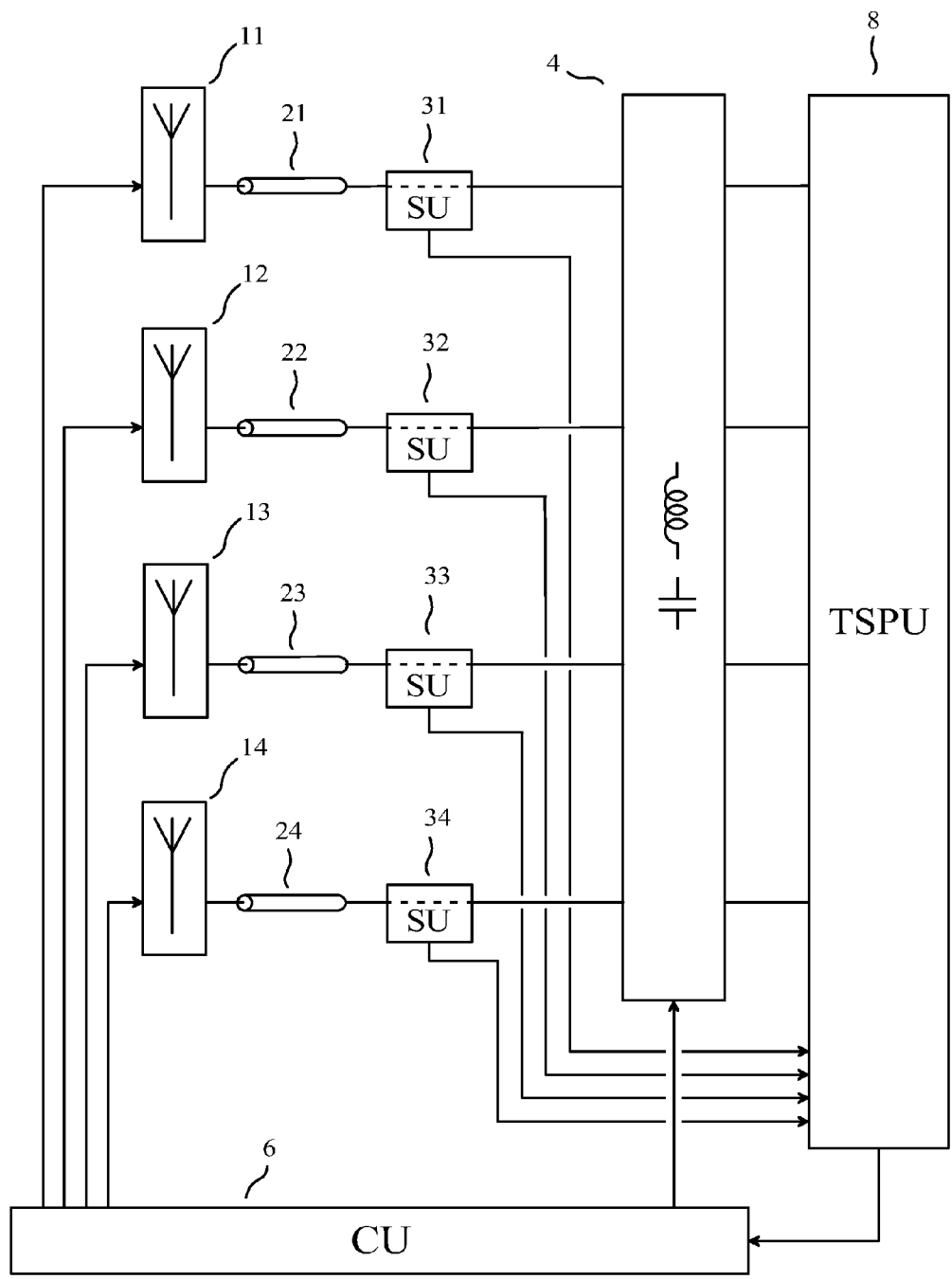
FIG. 3 shows a block diagram of an apparatus for radio communication of the invention (first embodiment)

As a first embodiment of a device of the invention, given by way of non-limiting example, we have represented in FIG. 3 the block diagram of an apparatus for radio communication comprising:

N=4 tunable passive antennas (11) (12) (13) (14), the tunable passive antennas operating simultaneously in a given frequency band, the tunable passive antennas forming a multiport antenna array, each of the tunable passive antennas comprising at least one antenna control device, one or more characteristics of said each of the tunable passive antennas being controlled by utilizing said at least one antenna control device, said at least one antenna control device having at least one parameter having an influence on said one or more characteristics, said at least one parameter being adjustable by electrical means;

a multiple-input-port and multiple-output-port tuning unit (4) having m=4 input ports and n=N output ports, the multiple-input-port and multiple-output-port tuning unit comprising p adjustable impedance devices, where p is an integer greater than or equal to 2m=8, the p adjustable impedance devices being referred to as "the adjustable impedance devices of the tuning unit" and being such that, at a given frequency greater than or equal to 30 MHz, each of the adjustable impedance devices of the tuning unit has a reactance, the reactance of any one of the adjustable impedance devices of the tuning unit being adjustable by electrical means;

n sensing units (31) (32) (33) (34), each of the sensing units delivering two "sensing unit output signals", each of the sensing unit output signals being determined by an electrical variable sensed (or measured) at one of the output ports;

N feeders (21) (22) (23) (24), each of the feeders having a first end which is directly coupled to a signal port of one and only one of the tunable passive antennas, each of the feeders having a second end which is indirectly coupled to one and only one of the output ports, through one and only one of the sensing units;

a transmission and signal processing unit (8), the transmission and signal processing unit applying m excitations to the m input ports, one and only one of the excitations being applied to each of the input ports, the transmission and signal processing unit estimating q real quantities depending on an impedance matrix seen by the output ports, where q is an integer greater than or equal to m, by utilizing the sensing unit output signals, the transmission and signal processing unit delivering one or more "antenna adjustment instructions", each of the one or more antenna adjustment instructions being determined as a function of one or more of said q real quantities depending on an impedance matrix seen by the output ports, the transmission and signal processing unit delivering one or more "tuning unit adjustment instructions", each of the one or more tuning unit adjustment instructions being determined as a function of at least m of said q real quantities depending on an impedance matrix seen by the output ports; and a control unit (6), the control unit delivering one or more "antenna control signals" to the tunable passive antennas, each of the one or more antenna control signals being determined as a function of at least one of the one or more antenna adjustment instructions, each of said parameters being mainly determined by at least one of the one or more antenna control signals, the control unit delivering one or more "tuning control signals" to the multiple-input-port and multiple-output-port tuning unit, each of the one or more tuning control signals being determined as a function of at least one of the one or more tuning unit adjustment instructions, the reactance of each of the adjustable impedance devices of the tuning unit being mainly determined by at least one of the one or more tuning control signals.

Each of the tunable passive antennas is indirectly coupled to one and only one of the output ports. More precisely, for each of the tunable passive antennas, the signal port of the antenna is indirectly coupled to one and only one of the output ports, through one and only one of the sensing units and one and only one of the feeders. Moreover, each of the output ports is indirectly coupled to one and only one of the tunable passive antennas. More precisely, each of the output ports is indirectly coupled to the signal port of one and only one of the tunable passive antennas, through one and only one of the sensing units and one and only one of the feeders. The given frequency lies in the given frequency band. The given frequency band only contains frequencies greater than or equal to 30 MHz.

Each of the sensing units (31) (32) (33) (34) may for instance be such that the two sensing unit output signals delivered by said each of the sensing units comprise: a first sensing unit output signal proportional to a first electrical variable, the first electrical variable being a voltage across one of the output ports; and a second sensing unit output signal proportional to a second electrical variable, the second electrical variable being a current flowing out of said one of the output ports. Said voltage across one of the output ports may be a complex voltage and said current flowing out of said one of the output ports may be a complex current. Alternatively, each of the sensing units (31) (32) (33) (34) may for instance be such that the two sensing unit output signals delivered by said each of the sensing units comprise: a first sensing unit output signal proportional to a first electrical variable, the first electrical variable being an incident voltage (which may also be referred to as "forward voltage") at one of the output ports; and a second sensing unit output signal proportional to a second electrical variable, the second electrical variable being a reflected voltage at said one of the output ports. Said incident voltage at one of the output ports may be a complex incident voltage and said reflected voltage at said one of the output ports may be a complex reflected voltage.

Each of the m input ports is directly coupled to a port of the transmission and signal processing unit (8), said port of the transmission and signal processing unit delivering one and only one of the excitations. Each of the one or more antenna adjustment instructions may be of any type of digital message. Each of the one or more tuning unit adjustment instructions may be of any type of digital message. The one or more antenna adjustment instructions and the one or more tuning unit adjustment instructions are delivered during one or more adjustment sequences. Two different adjustment sequences are described below, in the sixth embodiment and in the seventh embodiment. The duration of an adjustment sequence is less than 100 microseconds.

The multiple-input-port and multiple-output-port tuning unit (4) is such that, at said given frequency, if the impedance matrix seen by the output ports is equal to a given non-diagonal impedance matrix, a mapping associating the impedance matrix presented by the input ports to the p reactances is defined, the mapping having, at a given value of each of the p reactances, a partial derivative with respect to each of the p reactances, a span of the p partial derivatives being defined in the set of the complex matrices of size m by m considered as a real vector space, any diagonal complex matrix of size m by m having the same diagonal entries as at least one element of the span of the p partial derivatives.

This must be interpreted as meaning: the multiple-input-port and multiple-output-port tuning unit is such that, at said given frequency, there exists a non-diagonal impedance matrix referred to as the given non-diagonal impedance matrix, the given non-diagonal impedance matrix being such that, if an impedance matrix seen by the output ports is equal to the given non-diagonal impedance matrix, then a mapping associating an impedance matrix presented by the input ports to the p reactances is defined, the mapping having, at a given value of each of the p reactances, a partial derivative with respect to each of the p reactances, a span of the p partial derivatives being defined in the set of the complex matrices of size m by m considered as a real vector space, any diagonal complex matrix of size m by m having the same diagonal entries as at least one element of the span of the p partial derivatives.

The specialist knows that the dimension of the span of the p partial derivatives considered as a real vector space has been used and explained: in the French patent application No. 12/02542; in the international application PCT/IB2013/058423; and in the sections I, III, VI, VII and VIII of the article of F. Broydé and E. Clavelier entitled "Some Properties of Multiple-Antenna-Port and Multiple-User-Port Antenna Tuners", published in *IEEE Trans. on Circuits and Systems—I: Regular Papers*, Vol. 62, No. 2, pp. 423-432, in February 2015. In this article, said dimension of the span of the p partial derivatives is referred to as the local dimension of the user port impedance range, and denoted by $D_{UR}(Z_{Sant})$. A specialist understands that, to obtain that any diagonal complex matrix of size m by m has the same diagonal entries as at least one element of the span of the p partial derivatives, it is necessary that the dimension of the span of the p partial derivatives considered as a real vector space is greater than or equal to the dimension of the subspace of the diagonal complex matrices of size m by m considered as a real vector space. Since the dimension of the span of the p partial derivatives considered as a real vector space is less than or equal to p, and since the dimension of the subspace of the diagonal complex matrices of size m by m considered as a real vector space is equal to 2m, the necessary condition implies that p is an integer greater than or equal to 2m. This is why the requirement "p is an integer greater than or equal to 2m" is an essential characteristic of this embodiment.

The multiple-input-port and multiple-output-port tuning unit (4) is such that it can provide, at said given frequency, for suitable values of the tuning control signals, a low-loss transfer of power from the input ports to the output ports, and a low-loss transfer of power from the output ports to the input ports.

The specialist sees that the apparatus for radio communication allows, at the given frequency, a transfer of power from them input ports to an electromagnetic field radiated by the tunable passive antennas. In other words, the apparatus for radio communication is such that, if a power is received by the m input ports at the given frequency, a part of said power received by the m input ports is transferred to an electromagnetic field radiated by the tunable passive antennas at the given frequency, so that a power of the electromagnetic field radiated by the tunable passive antennas at the given frequency is equal to said part of said power received by the m input ports. The apparatus for radio communication also allows, at the given frequency, a transfer of power from an electromagnetic field incident on the tunable passive antennas to the m input ports. Additionally, the multiple-input-port and multiple-output-port tuning unit (4) and the tunable passive antennas (11) (12) (13) (14) are such that, at said given frequency, for suitable values of the tuning control signals and of the antenna control signals, a low-loss transfer of power from the m input ports to an electromagnetic field radiated by the tunable passive antennas can be obtained (for radio emission), and a low-loss transfer of power from an electromagnetic field incident on the tunable passive antennas to the m input ports can be obtained (for radio reception). Thus, it is possible to say that the apparatus for radio communication allows, at the given frequency, for suitable values of the tuning control signals and of the antenna control signals, a low-loss transfer of power from the m input ports to an electromagnetic field radiated by the tunable passive antennas, and a low-loss transfer of power from an electromagnetic field incident on the tunable passive antennas to the m input ports.

The suitable values of the tuning control signals and of the antenna control signals are provided automatically. Thus, the specialist understands that any small variation in the impedance matrix seen by the output ports can be at least partially compensated with a new automatic adjustment of the tunable passive antennas and of the adjustable impedance devices of the tuning unit.

The apparatus for radio communication is a portable radio transceiver, so that the transmission and signal processing unit (8) also performs functions which have not been mentioned above, and which are well known to specialists. For instance, the apparatus for radio communication can be a user equipment (UE) of an LTE-advanced wireless network.

The specialist understands that $Z_{Sant}$ depends on the frequency and on the electromagnetic characteristics of the volume surrounding the tunable passive antennas. In particular, the body of the user has an effect on $Z_{Sant}$, and $Z_{Sant}$ depends on the position of the body of the user. This is referred to as "user interaction", or "hand effect" or "finger effect". The specialist understands that the apparatus for radio communication may automatically compensate a variation in $Z_{Sant}$ caused by a variation in a frequency of operation, and/or automatically compensate the user interaction.

In order to respond to variations in the electromagnetic characteristics of the volume surrounding the tunable passive antennas and/or in the frequency of operation, a new adjustment sequence starts shortly after each change of the frequency of operation, and no later than 10 milliseconds after the beginning of the previous adjustment sequence.

In this first embodiment, N=n=m=4. Thus, it is possible that N is greater than or equal to 3, it is possible that N is greater than or equal to 4, it is possible that n is greater than or equal to 3, it is possible that n is greater than or equal to 4, it is possible that m is greater than or equal to 3, and it is possible that m is greater than or equal to 4.

Second Embodiment

The second embodiment of a device of the invention, given by way of non-limiting example, also corresponds to the apparatus for radio communication shown in FIG. 3, and all explanations provided for the first embodiment are applicable to this second embodiment. Additionally, in this second embodiment, the m excitations are applied successively to the input ports, that is to say: the m excitations are applied one after another to the input ports. Thus, for instance, it is not possible that two or more of the excitations are applied simultaneously. Each of the m excitations applied successively to the input ports may for instance comprise a sinusoidal signal at said given frequency, for instance a sinusoidal current at said given frequency applied to one and only one of the input ports, said one and only one of the input ports being a different input port for each of the m excitations. Each of the m excitations applied successively to the input ports may for instance comprise a sinusoidal signal at a frequency different from said given frequency, or a non-sinusoidal signal.

The transmission and signal processing unit successively applies the m excitations to the input ports. For instance, if the input ports are numbered from 1 to m, if the excitations are numbered from 1 to m, and if a is any integer greater than or equal to 1 and less than or equal to m, the excitation number a may consist of a voltage applied to the input port number a and no voltage applied to the other input ports, or consist of a current applied to the input port number a and no current applied to the other input ports.

In this second embodiment, $q=2n^2$ and the q real quantities depending on an impedance matrix seen by the output ports fully determine the impedance matrix seen by the output ports. Also, the two sensing unit output signals of each of said sensing units are proportional to a complex voltage across one of the output ports and to a complex current flowing out of said one of the output ports, respectively, as explained above. To explain how the transmission and signal processing unit (8) can use the sensing unit output signals caused by the m excitations applied successively to the input ports, to estimate q real quantities depending on an impedance matrix seen by the output ports, we are going to consider two examples of signal processing.

In the first example of signal processing, we assume that, for any integer a greater than or equal to 1 and less than or equal to m, the excitation number a consists of a current at the given frequency applied to the input port number a and no current applied to the other input ports. For a given tuning unit adjustment instruction, the output ports present an impedance matrix $Z_{LIOC}$, and the excitation number a causes a vector of the open-circuit voltages at the output ports, denoted by $V_{TPOC\ a}$. Here, $Z_{LIOC}$ is a complex matrix of size n by n and $V_{TPOC\ a}$ is a complex vector of size n by 1. The specialist sees that, while the excitation number a is being applied, the vector of the complex currents measured by the sensing units is given by $$I_{TP\ a} = (Z_{Sant} + Z_{LIOC})^{-1} V_{TPOC\ a} \quad (5)$$

and the vector of the complex voltages measured by the sensing units is given by $$V_{TP\ a} = Z_{Sant} I_{TP\ a} \quad (6)$$

in which $I_{TP\ a}$ is given by the equation (5).

Let $I_{TP}$ be the complex matrix of size n by m whose column vectors are $I_{TP\ 1}, \ldots, I_{TP\ m}$, and let $V_{TP}$ be the complex matrix of size n by m whose column vectors are $V_{TP\ 1}, \ldots, V_{TP\ m}$. We have $$V_{TP} = Z_{Sant} I_{TP} \quad (7)$$

In this embodiment, m=n, and the multiple-input-port and multiple-output-port tuning unit (4) is such that $I_{TP}$ is invertible, so that $$Z_{Sant} = V_{TP} I_{TP}^{-1} \quad (8)$$

Since, for each entry of $V_{TP}$ or of $I_{TP}$, one of the sensing unit output signals is, while one of the excitations is being applied, proportional to this entry of $V_{TP}$ or of $I_{TP}$, the transmission and signal processing unit can use the equation (8) to compute $Z_{Sant}$. Thus, in the first example of signal processing, said q real quantities depending on an impedance matrix seen by the output ports may consist of $n^2$ real numbers each proportional to the real part of an entry of $Z_{Sant}$ and of $n^2$ real numbers each proportional to the imaginary part of an entry of $Z_{Sant}$.

In the second example of signal processing, we assume that, for any integer a greater than or equal to 1 and less than or equal to m, the excitation number a consists of a voltage at the given frequency applied to the input port number a and no voltage applied to the other input ports. For a given tuning unit adjustment instruction, the output ports present an impedance matrix $Z_{LISC}$, and the excitation number a causes a vector of the open-circuit voltages at the output ports, denoted by $V_{TPSC\ a}$. Here, $Z_{LISC}$ is a complex matrix of size n by n and $V_{TPSC\ a}$ is a complex vector of size n by 1. The specialist sees that, while the excitation number a is being applied, the vector of the complex currents measured by the sensing units is given by $$I_{TP\ a} = (Z_{Sant} + Z_{LISC})^{-1} V_{TPSC\ a} \quad (9)$$

and the vector of the complex voltages measured by the sensing units is given by the equation (6) in which $I_{TP\ a}$ is given by the equation (9). Let $I_{TP}$ be the complex matrix of size n by m whose column vectors are $I_{TP\ 1}, \ldots, I_{TP\ m}$, and let $V_{TP}$ be the complex matrix of size n by m whose column vectors are $V_{TP\ 1}, \ldots, V_{TP\ m}$. The matrices $I_{TP}$ and $V_{TP}$ of this second example of signal processing may be completely different from the matrices $I_{TP}$ and $V_{TP}$ of the first example of signal processing. However, they satisfy the equation (7). The multiple-input-port and multiple-output-port tuning unit (4) being such that $I_{TP}$ is invertible, the matrices $I_{TP}$ and $V_{TP}$ of this second example of signal processing also satisfy the equation (8), so that the transmission and signal processing unit can use the equation (8) to compute $Z_{Sant}$. Thus, in the second example of signal processing, said q real quantities depending on an impedance matrix seen by the output ports may consist of $n^2$ real numbers each proportional to the real part of an entry of $Z_{Sant}$ and of $n^2$ real numbers each proportional to the imaginary part of an entry of $Z_{Sant}$. Alternatively, said q real quantities depending on an impedance matrix seen by the output ports may consist of $n^2$ real numbers each proportional to the absolute value of an entry of $Z_{Sant}$ and of $n^2$ real numbers each proportional to the argument of an entry of $Z_{Sant}$.

Third Embodiment

The third embodiment of a device of the invention, given by way of non-limiting example, also corresponds to the apparatus for radio communication shown in FIG. 3, and all explanations provided for the first embodiment are applicable to this third embodiment. Additionally, in this third embodiment, the m excitations are not applied successively to the input ports, that is to say: the m excitations are not applied one after another to the input ports. Thus, for instance, it is possible that two or more of the excitations are applied simultaneously to the input ports. Thus, for instance, it is possible that the m excitations are applied simultaneously to the input ports.

Moreover, each of the excitations is a bandpass signal. This type of signal is sometimes improperly referred to as "passband signal" or "narrow-band signal" (in French: "signal à bande étroite"). A bandpass signal is any real signal s(t), where t denotes the time, such that the spectrum of s(t) is included in a frequency interval $[f_C-W/2, f_C+W/2]$, where $f_C$ is a frequency referred to as "carrier frequency" and where W is a frequency referred to as "bandwidth", which satisfies $W<2f_C$. Thus, the Fourier transform of s(t), denoted by S(f), is non-negligible only in the frequency intervals $[-f_C-W/2, -f_C+W/2]$ and $[f_C-W/2, f_C+W/2]$. The complex envelope of the real signal s(t), also referred to as "complex baseband equivalent" or "baseband-equivalent signal", is a complex signal $s_B(t)$ whose Fourier transform $S_B(f)$ is non-negligible only in the frequency interval $[-W/2, W/2]$ and satisfies $S_B(f)=k\ S(f_C+f)$ in this interval, where k is a real constant which is chosen equal to the square root of 2 by some authors. The real part of $s_B(t)$ is referred to as the in-phase component, and the imaginary part of $s_B(t)$ is referred to as the quadrature component. The specialist knows that the bandpass signal s(t) may for instance be obtained:

- as the result of a phase and amplitude modulation of a single carrier at the frequency $f_C$;
- as a linear combination of a first signal and a second signal, the first signal being the product of the in-phase component and a first sinusoidal carrier of frequency $f_C$, the second signal being the product of the quadrature component and a second sinusoidal carrier of frequency $f_C$, the second sinusoidal carrier being 90° out of phase with respect to the first sinusoidal carrier;
- in other ways, for instance without using any carrier, for instance using directly a filtered output of a digital-to-analog converter.

The frequency interval $[f_C-W/2, f_C+W/2]$ is a passband of the bandpass signal. From the definitions, it is clear that, for a given bandpass signal, several choices of carrier frequency $f_C$ and of bandwidth W are possible, so that the passband of the bandpass signal is not uniquely defined. However, any passband of the bandpass signal must contain any frequency at which the spectrum of s(t) is not negligible.

The complex envelope of the real signal s(t) clearly depends on the choice of a carrier frequency $f_C$. However, for a given carrier frequency, the complex envelope of the real signal s(t) is uniquely defined, for a given choice of the real constant k.

One and only one of said m excitations is applied to each of the input ports, two or more of the excitations being applied simultaneously. Each of said m excitations is a bandpass signal having a passband which contains said given frequency. Said given frequency being considered as a carrier frequency, each of the excitations has one and only one complex envelope (or complex baseband equivalent), the m complex envelopes of the m excitations being linearly independent in E, where E is the set of complex functions of one real variable, regarded as a vector space over the field of complex numbers.

Let us number the input ports from 1 to m, and let us number the excitations from 1 to m, in such a way that, if a is an integer greater than or equal to 1 and less than or equal to m, the excitation number a is applied to the input port number a. For instance, if we use t to denote time, the excitations may be such that, for any integer a greater than or equal to 1 and less than or equal to m, the excitation number a consists of a current $i_a(t)$, of complex envelope $i_{E\ a}(t)$, applied to the input port number a, the complex envelopes $i_{E\ 1}(t), \ldots, i_{E\ m}(t)$ being linearly independent in E. It is possible to show that, if the bandwidth of the complex envelopes $i_{E\ 1}(t), \ldots, i_{E\ m}(t)$ is sufficiently narrow, then for any integer a greater than or equal to 1 and less than or equal to m, any voltage or current measured at anyone of the output ports and caused by the excitation number a is a bandpass signal whose complex envelope is proportional to $i_{E\ a}(t)$, the coefficient of proportionality being complex and time-independent. Thus, if we use S to denote the span of $i_{E\ 1}(t), \ldots, i_{E\ m}(t)$ in E, it is possible to say that: $i_{E\ 1}(t), \ldots, i_{E\ m}(t)$ is a basis of S; any voltage or current measured at anyone of the output ports and caused by the excitations is a bandpass signal whose complex envelope lies in S; and, for any integer a greater than or equal to 1 and less than or equal to m, the product of the a-th coordinate of the complex envelope of this voltage or current in the basis $i_{E\,1}(t), \ldots, i_{E\,m}(t)$ and the vector $i_{E\,a}(t)$ is equal to the part of the complex envelope of this voltage or current which is caused by the excitation number a. Consequently, the contributions of the different excitations can be identified with suitable signal processing, as if the different excitations had been applied successively to the input ports. The specialist sees that, once this has been done, the first example of signal processing of the second embodiment can be adapted to the context of this third embodiment, to obtain the q real quantities depending on an impedance matrix seen by the output ports.

More precisely, in an example of signal processing, we assume that, as above, for any integer a greater than or equal to 1 and less than or equal to m, the excitation number a consists of a current $i_a(t)$, of complex envelope $i_{E\,a}(t)$, applied to the input port number a, the complex envelopes $i_{E\,1}(t), \ldots, i_{E\,m}(t)$ being linearly independent in E. For a given tuning unit adjustment instruction, the output ports present an impedance matrix $Z_{LIOC}$, and the excitations cause, at the output ports: n open-circuit voltages, of complex envelopes $v_{TPOC\,1}(t), \ldots, v_{TPOC\,n}(t)$; n currents flowing out of the output ports, of complex envelopes $i_{TP\,1}(t), \ldots, i_{TP\,n}(t)$; and n voltages across the output ports, of complex envelopes $v_{TP\,1}(t), \ldots, v_{TP\,n}(t)$. As explained above, if the bandwidth of the complex envelopes $i_{E\,1}(t), \ldots, i_{E\,m}(t)$ is sufficiently narrow, for any integer a greater than or equal to 1 and less than or equal to m, the product of the a-th coordinate of each of these complex envelopes in the basis $i_{E\,1}(t), \ldots, i_{E\,m}(t)$ and the vector $i_{E\,a}(t)$ is equal to the part of said each of these complex envelopes which is caused by the excitation number a. We can use $u_{TPOC\,a}$ to denote the column vector of the a-th coordinates of the complex envelopes $v_{TPOC\,1}(t), \ldots, v_{TPOC\,n}(t)$ in this basis. Likewise, we can use $j_{TP\,a}$ to denote the column vector of the a-th coordinates of the complex envelopes $i_{TP\,1}(t), \ldots, i_{TP\,n}(t)$ in this basis. Likewise, we can use $u_{TP\,a}$ to denote the column vector of the a-th coordinates of the complex envelopes $v_{TP\,1}(t), \ldots, v_{TP\,n}(t)$ in this basis. Here, $Z_{LIOC}$ is a complex matrix of size n by n, and $u_{TPOC\,a}$, $j_{TP\,a}$, and $u_{TP\,a}$ are complex vectors of size n by 1. The specialist sees that $$j_{TP\,a} = (Z_{Sant} + Z_{LIOC})^{-1} u_{TPOC\,a} \quad (10)$$

and $$u_{TP\,a} = Z_{Sant} j_{TP\,a} \quad (11)$$

Let $J_{TP}$ be the complex matrix of size n by m whose column vectors are $j_{TP\,1}, \ldots, j_{TP\,m}$, and let $U_{TP}$ be the complex matrix of size n by m whose column vectors are $u_{TP\,1}, \ldots, u_{TP\,m}$. We have $$U_{TP} = Z_{Sant} J_{TP} \quad (12)$$

In this embodiment, m=n, and the multiple-input-port and multiple-output-port tuning unit (4) is such that $J_{TP}$ is invertible, so that $$Z_{Sant} = U_{TP} J_{TP}^{-1} \quad (13)$$

The specialist understands how the sensing unit output signals can be processed to obtain the entries of $U_{TP}$ and of $J_{TP}$. For instance, let us assume that, for any integer b greater than or equal to 1 and less than or equal to n, the sensing unit number b delivers: a first sensing unit output signal proportional to the voltage across the output port number b; and a second sensing unit output signal proportional to the current flowing out of this output port. The transmission and signal processing unit may for instance perform an in-phase/quadrature (I/Q) demodulation (homodyne reception) of these sensing unit output signals, to obtain, for any integer b greater than or equal to 1 and less than or equal to n, four analog signals: the real part of $v_{TP\,b}(t)$; the imaginary part of $v_{TP\,b}(t)$; the real part of $i_{TP\,b}(t)$; and the imaginary part of $i_{TP\,b}(t)$. These analog signals may then be converted into digital signals and further processed in the digital domain, to estimate the coordinates of the complex envelope of the voltage across the output port number b in the basis $i_{E\,1}(t), \ldots, i_{E\,m}(t)$, that is to say the row b of $U_{TP}$, and to estimate the coordinates of the complex envelope of the current flowing out of the output port number b in the basis $i_{E\,1}(t), \ldots, i_{E\,m}(t)$, that is to say the row b of $J_{TP}$. In this manner, all entries of $U_{TP}$ and of $J_{TP}$ can be obtained.

Once the entries of $U_{TP}$ and of $J_{TP}$ have been obtained, the equation (13) can be used to compute $Z_{Sant}$ and/or its inverse $Y_{Sant}$. Thus, in this example of signal processing, said q real quantities depending on an impedance matrix seen by the output ports may consist of $n^2$ real numbers each proportional to the real part of an entry of $Y_{Sant}$ and of $n^2$ real numbers each proportional to the imaginary part of an entry of $Y_{Sant}$.

This example of signal processing shows that, in an embodiment where the m excitations are not applied successively, the effects of the different excitations can be identified with suitable signal processing, as if the different excitations had been applied successively to the input ports, so that the m excitations can be used to estimate the impedance matrix seen by the output ports, and any real quantity depending on the impedance matrix seen by the output ports.

We observe that, in standards typically applicable to MIMO wireless networks, signals having complex envelopes which are linearly independent in E are used as reference signals (also referred to as pilot signals) for MIMO channel estimation. We see that these signals used as reference signals, if they are applied to the input ports, can be used as excitations having complex envelopes which are linearly independent in E. Consequently, this third embodiment is compatible with the requirements of standards typically applicable to MIMO wireless networks. This question is further discussed below, in the fifth embodiment.

In this third embodiment, $q=2n^2$ and the q real quantities depending on an impedance matrix seen by the output ports fully determine the impedance matrix seen by the output ports. For instance, as said above, said q real quantities depending on an impedance matrix seen by the output ports may consist of $n^2$ real numbers each proportional to the real part of an entry of $Y_{Sant}$ and of $n^2$ real numbers each proportional to the imaginary part of an entry of $Y_{Sant}$. For instance, said q real quantities depending on an impedance matrix seen by the output ports may consist of $n^2$ real numbers each proportional to the absolute value of an entry of $Y_{Sant}$ and of $n^2$ real numbers each proportional to the argument of an entry of $Y_{Sant}$.

Fourth Embodiment

The fourth embodiment of a device of the invention, given by way of non-limiting example, also corresponds to the apparatus for radio communication shown in FIG. 3, and all explanations provided for the first embodiment and for the third embodiment are applicable to this fourth embodiment. Additionally, in this fourth embodiment, the complex envelopes of the m excitations are orthogonal to each other. More precisely, the complex envelopes of the m excitations are orthogonal to one another, for a given scalar product. Moreover, the scalar product of any one of the m complex envelopes and itself is nonzero, so that the orthogonality requirements entail that the m complex envelopes are linearly independent. We may use <f|g> to denote the scalar product of two functions f and g, which may be any scalar product satisfying the properties of conjugate symmetry, linearity in the second argument, and positivity (we do not require positive definiteness). For instance, we may consider that each of said complex envelope is square-integrable, and that the scalar product is the usual scalar product of the Hilbert space of square-integrable functions of a real variable, which, for two square-integrable functions f and g, is given by $$\langle f | g \rangle = \int_{-\infty}^{\infty} \overline{f(x)} g(x) dx \quad (14)$$

in which the bar above f(x) denotes the complex conjugate. Alternatively, we may for instance consider that two functions f and g are sampled at the same points in time, to obtain the samples f[j] off and the samples g[j] of g, where j is an integer, and that the scalar product is the usual scalar product of finite energy sequences, which is given by $$\langle f | g \rangle = \sum_{j=-\infty}^{\infty} \overline{f[j]} g[j] \quad (15)$$

Let us for instance consider the case in which the excitations are such that, for any integer a greater than or equal to 1 and less than or equal to m, the excitation number a consists of a current $i_a(t)$, of complex envelope $i_{E\,a}(t)$, applied to the input port number a, the complex envelopes $i_{E\,1}(t), \ldots, i_{E\,m}(t)$ being orthogonal to each other. In this case, the equation (13) is applicable, and the entries of $U_{TP}$ and of $J_{TP}$ can be easily computed, since, for any integer a greater than or equal to 1 and less than or equal to m, and for any integer b greater than or equal to 1 and less than or equal to n, the entry of the row b and the column a of $J_{TP}$, that is to say the b-th entry of the vector $j_{TP\,a}$, that is to say the a-th coordinate of the complex envelope $i_{TP\,b}(t)$ in the basis $i_{E\,1}(t), \ldots, i_{E\,m}(t)$, is clearly given by $$j_{ba} = \frac{\langle i_{Ea} | i_{TPb} \rangle}{\langle i_{Ea} | i_{Ea} \rangle} \quad (16)$$

and the entry of the row b and the column a of $U_{TP}$, that is to say the b-th entry of the vector $U_{TP\,a}$, that is to say the a-th coordinate of the complex envelope $v_{TP\,b}(t)$ in said basis, is clearly given by $$u_{ba} = \frac{\langle i_{Ea} | v_{TPb} \rangle}{\langle i_{Ea} | i_{Ea} \rangle} \quad (17)$$

For instance, let us assume that, for any integer b greater than or equal to 1 and less than or equal to n, the sensing unit number b delivers: a first sensing unit output signal proportional to the voltage across the output port number b; and a second sensing unit output signal proportional to the current flowing out of this output port. The transmission and signal processing unit may for instance perform a down-conversion of all sensing unit output signals, followed by an in-phase/quadrature (I/Q) demodulation (heterodyne reception), to obtain, for any integer b greater than or equal to 1 and less than or equal to n, four analog signals: the real part of $v_{TP\,b}(t)$; the imaginary part of $v_{TP\,b}(t)$; the real part of $i_{TP\,b}(t)$; and the imaginary part of $i_{TP\,b}(t)$. These analog signals may then be converted into digital signals and further processed in the digital domain, based on equations (16) and (17), to estimate all entries of $U_{TP}$ and of $J_{TP}$.

We have just considered, as an example, the case in which the excitations are such that, for any integer a greater than or equal to 1 and less than or equal to m, the excitation number a consists of a current $i_a(t)$, of complex envelope $i_{E\,a}(t)$, applied to the input port number a, the complex envelopes $i_{E\,1}(t), \ldots, i_{E\,m}(t)$ being orthogonal to each other. We have shown that, in this case, the effects of the different excitations can be easily identified, as if the different excitations had been applied successively to the input ports, so that them excitations can be used to estimate the impedance matrix seen by the output ports, and any real quantity depending on the impedance matrix seen by the output ports. Alternatively, the excitations could for instance be such that, for any integer a greater than or equal to 1 and less than or equal to m, the excitation number a consists of a voltage $v_a(t)$, of complex envelope $v_{E\,a}(t)$, applied to the input port number a, the complex envelopes $v_{E\,1}(t), \ldots, v_{E\,m}(t)$ being orthogonal to each other. In this case, using a proof similar to the one presented above for applied currents, we can show that the effects of the different excitations can be easily identified, as if the different excitations had been applied successively to the input ports, so that the m excitations can be used to estimate the impedance matrix seen by the output ports, and any real quantity depending on the impedance matrix seen by the output ports.

The specialist understands how to generate m excitations having complex envelopes which are orthogonal to one another. For instance, let us consider m arbitrary sequences of data symbols, each sequence being modulated on a single sub-carrier of an orthogonal frequency division multiplexing (OFDM) signal, different sequences being modulated on different sub-carriers. These m modulated sub-carriers are orthogonal to one another, so that each of these modulated sub-carriers could be used as the complex envelope of one of them excitations. For instance, orthogonality also exists between any two different resource elements of an OFDM signal (a resource element means one OFDM sub-carrier for the duration of one OFDM symbol), so that m different resource elements could each be used to obtain the complex envelope of one of the m excitations.

Fifth Embodiment (Best Mode)

The fifth embodiment of a device of the invention, given by way of non-limiting example and best mode of carrying out the invention, also corresponds to the apparatus for radio communication shown in FIG. 3, and all explanations provided for the first embodiment and for the third embodiment are applicable to this fifth embodiment. Additionally, in this fifth embodiment, each of the complex envelopes of them excitations is the sum of a first complex signal and a second complex signal, the first complex signal being referred to as the primary component of the complex envelope, the second complex signal being referred to as the secondary component of the complex envelope, the primary components of the m complex envelopes being orthogonal to each other, each of the primary components of the m complex envelopes being orthogonal to each of the secondary components of them complex envelopes. More precisely, the primary components of the m complex envelopes are orthogonal to one another, for a given scalar product, and each of the primary components of the m complex envelopes is orthogonal to each of the secondary components of the m complex envelopes, for the given scalar product. Moreover, the scalar product of any one of the primary components of them complex envelopes and itself is nonzero, so that the orthogonality requirements entail that the m complex envelopes are linearly independent.

Let us for instance consider the case in which the excitations are such that, for any integer a greater than or equal to 1 and less than or equal to m, the excitation number a consists of a current $i_a(t)$, of complex envelope $i_{E\ a}(t)$, applied to the input port number a, the complex envelope $i_{E\ a}(t)$ being of the form $$i_{E\ a}(t) = i_{C\ a}(t) + i_{D\ a}(t) \quad (18)$$

where $i_{C\ a}(t)$ is the primary component of the complex envelope, and $i_{D\ a}(t)$ is the secondary component of the complex envelope, the primary components $i_{C\ 1}(t), \ldots, i_{C\ m}(t)$ of them complex envelopes being orthogonal to each other, and each of the primary components $i_{C\ 1}(t), \ldots, i_{C\ m}(t)$ of the m complex envelopes being orthogonal to each of the secondary components $i_{D\ 1}(t), \ldots, i_{D\ m}(t)$ of them complex envelopes. In this case, the equation (13) is applicable, and the entries of $U_{TP}$ and of $J_{TP}$ can be easily computed, since, for any integer a greater than or equal to 1 and less than or equal to m, and for any integer b greater than or equal to 1 and less than or equal to n, the entry of the row b and the column a of $J\ T_p$, that is to say the b-th entry of the vector $j_{TP\ a}$ that is to say the a-th coordinate of the complex envelope $i_{TP\ b}(t)$ in the basis $i_{E\ 1}(t), \ldots, i_{E\ m}(t)$, is clearly given by $$j_{ba} = \frac{\langle i_{Ca} | i_{TPb} \rangle}{\langle i_{Ca} | i_{Ca} \rangle} \quad (19)$$

and the entry of the row b and the column a of $U_{TP}$, that is to say the b-th entry of the vector $u_{TP\ a}$, that is to say the a-th coordinate of the complex envelope $v_{TP\ b}(t)$ in said basis, is clearly given by $$u_{ba} = \frac{\langle i_{Ca} | v_{TPb} \rangle}{\langle i_{Ca} | i_{Ca} \rangle} \quad (20)$$

For instance, let us assume that, for any integer b greater than or equal to 1 and less than or equal to n, the sensing unit number b delivers: a first sensing unit output signal proportional to the voltage across the output port number b; and a second sensing unit output signal proportional to the current flowing out of this output port. In this case, the transmission and signal processing unit may for instance perform a down-conversion of all sensing unit output signals, followed by a conversion into digital signals using bandpass sampling, and by a digital quadrature demodulation, to obtain, for any integer b greater than or equal to 1 and less than or equal to n, four digital signals: the samples of the real part of $v_{TP\ b}(t)$; the samples of the imaginary part of $v_{TP\ b}(t)$; the samples of the real part of $i_{TP\ b}(t)$; and the samples of the imaginary part of $i_{TP\ b}(t)$. These digital signals may then be further processed, based on equations (19) and (20), to estimate all entries of $U_{TP}$ and of $J_{TP}$.

We have just considered, as an example, the case in which the excitations are such that, for any integer a greater than or equal to 1 and less than or equal to m, the excitation number a consists of a current $i_a(t)$, of complex envelope $i_{E\ a}(t)$, applied to the input port number a, the complex envelope $i_{E\ a}(t)$ being the sum of $i_{C\ a}(t)$ and $i_{D\ a}(t)$, where $i_{C\ a}(t)$ is the primary component of the complex envelope, and $i_{D\ a}(t)$ is the secondary component of the complex envelope, the primary components $i_{C\ 1}(t), \ldots, i_{C\ m}(t)$ of them complex envelopes being orthogonal to each other, each of the primary components $i_{C\ 1}(t), \ldots, i_{C\ m}(t)$ of them complex envelopes being orthogonal to each of the secondary components $i_{D\ 1}(t), \ldots, i_{D\ m}(t)$ of the m complex envelopes. We have shown that, in this case, the effects of the different excitations can be easily identified, as if the different excitations had been applied successively to the input ports, so that the m excitations can be used to estimate the impedance matrix seen by the output ports, and any real quantity depending on the impedance matrix seen by the output ports. Alternatively, the excitations could for instance be such that, for any integer a greater than or equal to 1 and less than or equal to m, the excitation number a consists of a voltage $v_a(t)$, of complex envelope $v_{E\ a}(t)$, applied to the input port number a, the complex envelope $v_{E\ a}(t)$ being the sum of $v_{C\ a}(t)$ and $v_{D\ a}(t)$, where $v_{C\ a}(t)$ is the primary component of the complex envelope, and $v_{D\ a}(t)$ is the secondary component of the complex envelope, the primary components $v_{C\ 1}(t), \ldots, v_{C\ m}(t)$ of the m complex envelopes being orthogonal to each other, each of the primary components $v_{C\ 1}(t), \ldots, v_{C\ m}(t)$ of the m complex envelopes being orthogonal to each of the secondary components $v_{D\ 1}(t), \ldots, v_{D\ m}(t)$ of the m complex envelopes. In this case, using a proof similar to the one presented above for applied currents, we can show that the effects of the different excitations can be easily identified, as if the different excitations had been applied successively to the input ports, so that the m excitations can be used to estimate the impedance matrix seen by the output ports, and any real quantity depending on the impedance matrix seen by the output ports.

We observe that the type of excitations used in the fourth embodiment is a special case of the more general type of excitations used in this fifth embodiment, since excitations used in this fifth embodiment and having zero secondary components can be used in the fourth embodiment.

The specialist understands how to generate m excitations having complex envelopes, each of said complex envelopes being the sum of a first complex signal and a second complex signal, the first complex signal being referred to as the primary component of the complex envelope, the second complex signal being referred to as the secondary component of the complex envelope, the primary components of the m complex envelopes being orthogonal to each other, each of the primary components of the m complex envelopes being orthogonal to each of the secondary components of the m complex envelopes. For instance, let us consider m arbitrary sequences of data symbols, each sequence being modulated on a single sub-carrier of an OFDM signal, different sequences being modulated on different sub-carriers. The sub-carriers modulated by the m arbitrary sequences are orthogonal to one another, and each of them is orthogonal to any combination of sub-carriers which are not modulated by any one of the m arbitrary sequences, and which may carry any data. Thus, each of the sub-carriers modulated by the m arbitrary sequences could be used as the primary component of the complex envelope of one of them excitations, and any combination of sub-carriers which are not modulated by any one of the m arbitrary sequences, and which may carry any data, could be used as the secondary component of the complex envelope of any one of them excitations. For instance, let us consider m different resource elements of an OFDM signal. The m different resource elements are orthogonal to one another, and each of the m different resource elements is orthogonal to any combination of resource elements which are not one of said m different resource elements. Thus, each of said m different resource elements could be used to obtain the primary component of the complex envelope of one of them excitations, and any combination of resource elements which are not one of said m different resource elements could be used to obtain the secondary component of the complex envelope of any one of them excitations.

We observe that, in typical standards applicable to MIMO wireless networks, OFDM or single carrier frequency domain equalization (SC-FDE) is used for transmission, and different resource elements in different spatial layers (also referred to as "spatial streams") are used to provide reference signals (also referred to as "pilots") for MIMO channel estimation. Such a reference signal, considered in a given spatial layer, can be used as the primary component of the complex envelope of one of the m excitations, and any combination of resource elements which are not used by such a reference signal, considered in a given spatial layer and carrying any data symbols, can be used to obtain the secondary component of the complex envelope of any one of them excitations. This is because the reference signals meet suitable orthogonality relations. Consequently, this fifth embodiment is compatible with the requirements of standards typically applicable to MIMO wireless networks.

Sixth Embodiment

Figure 4:
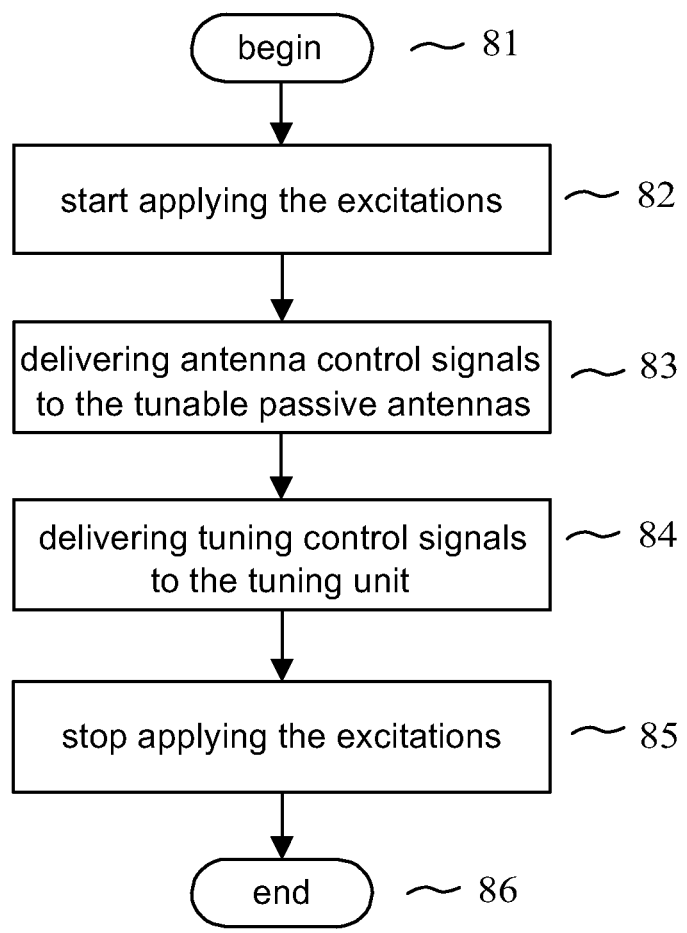
FIG. 4 shows a flowchart implemented in an apparatus for radio communication of the invention (sixth embodiment)

The sixth embodiment of a device of the invention, given by way of non-limiting example, also corresponds to the apparatus for radio communication shown in FIG. 3, and all explanations provided for the first embodiment are applicable to this sixth embodiment. A flowchart of one of the one or more adjustment sequences used in this sixth embodiment is shown in FIG. 4. Before the beginning of said one of the one or more adjustment sequences, a "selected frequency" has been defined by the transmission and signal processing unit. In addition to the begin symbol (81) and the end symbol (86), said flowchart comprises:
  a process "start applying the excitations" (82), in which the transmission and signal processing unit starts applying the excitations to the input ports, so that the transmission and signal processing unit becomes able to estimate the q real quantities depending on an impedance matrix seen by the output ports, by utilizing the sensing unit output signals caused by said excitations, each of said excitations having a carrier frequency which is equal to the selected frequency;
  a process "delivering antenna control signals to the tunable passive antennas" (83), in which the transmission and signal processing unit delivers one or more of the one or more antenna adjustment instructions, and in which the control unit delivers said one or more antenna control signals to the tunable passive antennas;
  a process "delivering tuning control signals to the tuning unit" (84), in which the transmission and signal processing unit delivers one or more of the one or more tuning unit adjustment instructions, and in which the control unit delivers said one or more tuning control signals to the multiple-input-port and multiple-output-port tuning unit; and
  a process "stop applying the excitations" (85), in which the transmission and signal processing unit stops applying the excitations to the input ports.

As said above, the tunable passive antennas operate simultaneously in the given frequency band, and they form a multiport antenna array. The multiport antenna array is such that each said at least one parameter of each said at least one antenna control device of each of the tunable passive antennas has an effect on the impedance matrix seen by the output ports, denoted by $Z_{Sant}$. Since each of said parameters is mainly determined by at least one of the one or more antenna control signals, the one or more antenna control signals have an effect on $Z_{Sant}$. Thus, the process "delivering antenna control signals to the tunable passive antennas" (83) uses a closed-loop control scheme, because one or more of said q real quantities depending on an impedance matrix seen by the output ports are used to obtain the one or more antenna adjustment instructions, and afterwards the one or more antenna control signals. Thus, this sixth embodiment uses a closed-loop control scheme to obtain the one or more antenna control signals.

In contrast, the process "delivering tuning control signals to the tuning unit" (84) uses an open-loop control scheme, since, as explained above, the invention uses an open-loop control scheme to obtain the one or more tuning control signals.

In this sixth embodiment, the one or more antenna adjustment instructions and the one or more antenna control signals are such that:
  at the end of the process "delivering antenna control signals to the tunable passive antennas" (83), the impedance matrix seen by the output ports approximates a specified impedance matrix, which may depend on frequency;
  each said at least one parameter of each said at least one antenna control device of each of the tunable passive antennas has a value which does not change from the end of the process "delivering antenna control signals to the tunable passive antennas" (83) to the end of said one of the one or more adjustment sequences.

To obtain that, at the end of the process "delivering antenna control signals to the tunable passive antennas" (83), the impedance matrix seen by the output ports approximates the specified impedance matrix, the transmission and signal processing unit estimates the q real quantities depending on an impedance matrix seen by the output ports, and uses an algorithm to determine and deliver the one or more antenna adjustment instructions. The algorithm uses the selected frequency and the q real quantities depending on an impedance matrix seen by the output ports, and it takes into account the one or more antenna adjustment instructions which were applicable while the sensing units delivered the sensing unit output signals used to estimate the q real quantities depending on an impedance matrix seen by the output ports. The specialist knows how to write such an algorithm. However, as said above in the prior art section, tunable passive antennas often only provide a poor tuning capability, so that, at the end of the process "delivering antenna control signals to the tunable passive antennas" (83), the impedance matrix seen by the output ports typically only coarsely approximates the specified impedance matrix.

Figure 5:
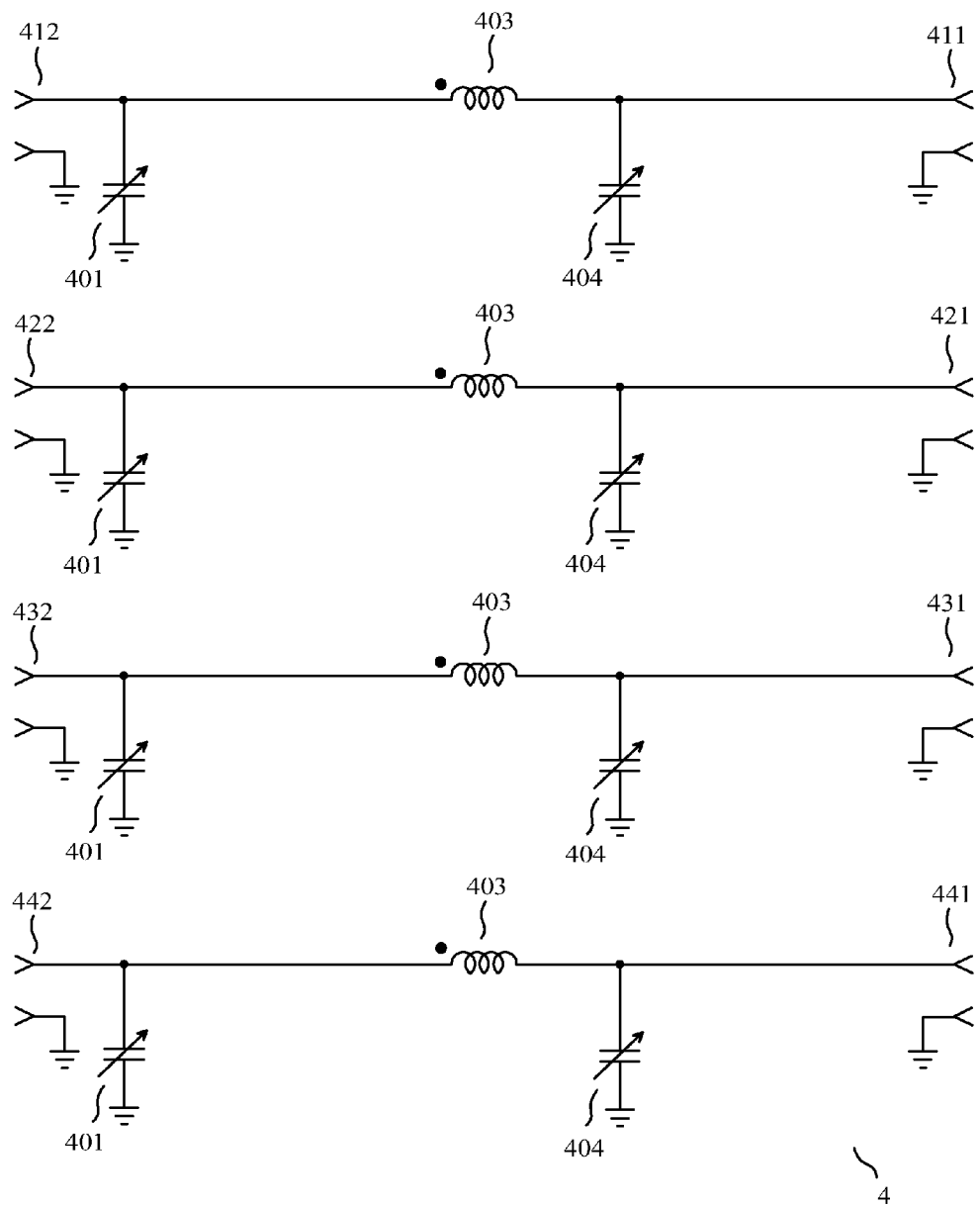
FIG. 5 shows a schematic diagram of a multiple-input-port and multiple-output-port tuning unit having 4 input ports and 4 output ports, which may be used in the apparatus for radio communication shown in FIG. 3 (sixth embodiment)

We have represented in FIG. 5 the multiple-input-port and multiple-output-port tuning unit (4) used in this sixth embodiment. This multiple-input-port and multiple-output-port tuning unit comprises:

n=4 output ports (412) (422) (432) (442);
m=4 input ports (411) (421) (431) (441);
n adjustable impedance devices of the tuning unit (401) each presenting a negative reactance and each being coupled in parallel with one of the output ports;
n=m windings (403) each having a first terminal coupled to one of the output ports and a second terminal coupled to one of the input ports; and
m adjustable impedance devices of the tuning unit (404) each presenting a negative reactance and each being coupled in parallel with one of the input ports.

It is possible that mutual induction exists between the windings (403). In this case, the inductance matrix of the windings is not a diagonal matrix.

If no mutual induction exists between the windings, we see that the multiple-input-port and multiple-output-port tuning unit shown in FIG. 5 is composed of n=m single-input-port and single-output-port tuning units, each comprising one or more of the adjustable impedance devices of the tuning unit, or two or more of the adjustable impedance devices of the tuning unit, these single-input-port and single-output-port tuning units being independent and uncoupled. Such a multiple-input-port and multiple-output-port tuning unit is for instance considered in the section III of the article of F. Broydé and E. Clavelier entitled "Two Multiple-Antenna-Port and Multiple-User-Port Antenna Tuners", published in *Proc. 9th European Conference on Antenna and Propagation, EuCAP* 2015, in April 2015.

All adjustable impedance devices of the tuning unit (401) (404) are adjustable by electrical means, but the circuits and the control links needed to determine the reactance of each of the adjustable impedance devices of the tuning unit are not shown in FIG. 5. In this sixth embodiment, we use p=2m=8 adjustable impedance devices of the tuning unit.

The specialist understands that the multiple-input-port and multiple-output-port tuning unit is such that, at the given frequency, there exists a diagonal impedance matrix referred to as "the given diagonal impedance matrix", the given diagonal impedance matrix being such that, if an impedance matrix seen by the output ports is equal to the given diagonal impedance matrix, then the reactance of any one of the adjustable impedance devices of the tuning unit has an influence on the impedance matrix presented by the input ports.

At the beginning of the process "delivering tuning control signals to the tuning unit" (84), the transmission and signal processing unit again estimates the q real quantities depending on an impedance matrix seen by the output ports, to obtain new values of said q real quantities depending on an impedance matrix seen by the output ports, said new values being representative of an impedance matrix seen by the output ports immediately after the end of the process "delivering antenna control signals to the tunable passive antennas" (83). The process "delivering tuning control signals to the tuning unit" (84) uses a lookup table (also spelled "look-up table") to determine the one or more tuning unit adjustment instructions, as a function of the selected frequency and of the q real quantities depending on an impedance matrix seen by the output ports (more precisely, of said new values of said q real quantities depending on an impedance matrix seen by the output ports). The specialist understands how to build and use such a lookup table. The adaptive process carried out by the transmission and signal processing unit requires neither complex computations nor any iteration, because the lookup table directly uses the selected frequency and the q real quantities depending on an impedance matrix seen by the output ports to determine the one or more tuning unit adjustment instructions (so that there is a direct relationship between the real quantities depending on an impedance matrix seen by the output ports and the reactance value that each of the adjustable impedance devices of the tuning unit should take on after being adjusted). The lookup table is built as from experimental results and is such that the adjustment of the multiple-input-port and multiple-output-port tuning unit is always optimal or almost optimal, in spite of the losses in the multiple-input-port and multiple-output-port tuning unit.

Consequently, this embodiment is a solution to the problem of automatically adjusting the plurality of tunable passive antennas coupled to a radio transmitter used for MIMO wireless communication, in a manner that provides: a good tuning capability, by utilizing a multiple-input-port and multiple-output-port tuning unit; and an adjustment of the multiple-input-port and multiple-output-port tuning unit which is close to an optimal adjustment, when its losses are not very small. Moreover, this embodiment provides a much broader tuning range than an automatic tuning system which would comprise the multiple-input-port and multiple-output-port tuning unit shown in FIG. 5, but no tunable passive antenna.

Seventh Embodiment

Figure 6:
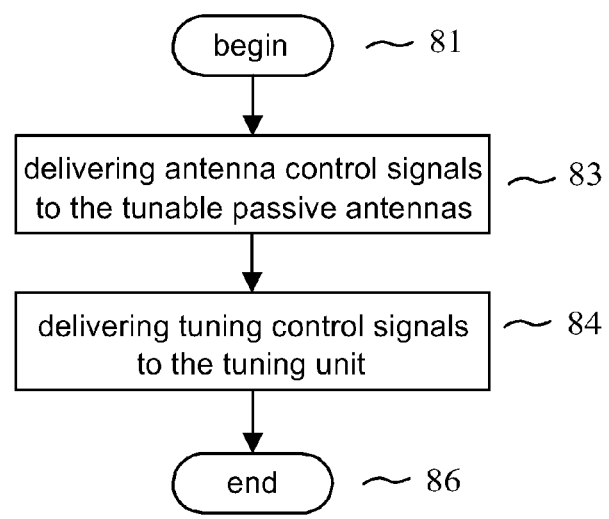
FIG. 6 shows a flowchart implemented in an apparatus for radio communication of the invention (seventh embodiment)

The seventh embodiment of a device of the invention, given by way of non-limiting example, also corresponds to the apparatus for radio communication shown in FIG. 3, and all explanations provided for the first embodiment are applicable to this seventh embodiment. In this seventh embodiment, the excitations are applied continuously, so that the sensing units can continuously deliver the sensing unit output signals caused by said excitations. A flowchart of one of the one or more adjustment sequences used in this seventh embodiment is shown in FIG. 6. Before said one of the one or more adjustment sequences, a "selected frequency" has been defined by the transmission and signal processing unit. Each of the excitations has, during said one of the one or more adjustment sequences, a carrier frequency which is equal to the selected frequency. In addition to the begin symbol (81) and the end symbol (86), said flowchart comprises:

a process "delivering antenna control signals to the tunable passive antennas" (83), in which the transmission and signal processing unit delivers one or more of the one or more antenna adjustment instructions, and in which the control unit delivers said one or more antenna control signals to the tunable passive antennas; and a process "delivering tuning control signals to the tuning unit" (84), in which the transmission and signal processing unit delivers one or more of the one or more tuning unit adjustment instructions, and in which the control unit delivers said one or more tuning control signals to the multiple-input-port and multiple-output-port tuning unit.

In this seventh embodiment, the one or more antenna adjustment instructions and the one or more antenna control signals are such that:

at the end of the process "delivering antenna control signals to the tunable passive antennas" (83), the impedance matrix seen by the output ports approximates a specified impedance matrix, which may depend on frequency;

each said at least one parameter of each said at least one antenna control device of each of the tunable passive antennas has a value which does not change from the end of the process "delivering antenna control signals to the tunable passive antennas" (83) to the beginning of an adjustment sequence which follows the end of said one of the one or more adjustment sequences.

To obtain that, at the end of the process "delivering antenna control signals to the tunable passive antennas" (83), the impedance matrix seen by the output ports approximates the specified impedance matrix, the transmission and signal processing unit estimates the q real quantities depending on an impedance matrix seen by the output ports, and uses a lookup table to determine and deliver the one or more antenna adjustment instructions, as a function of the selected frequency and of the q real quantities depending on an impedance matrix seen by the output ports, and taking into account the one or more antenna adjustment instructions which were applicable while the sensing units delivered the sensing unit output signals used to estimate the q real quantities depending on an impedance matrix seen by the output ports. The specialist understands how to build and use such a lookup table. The lookup table is such that the adjustments of the tunable passive antennas are always optimal or almost optimal. However, as said above in the prior art section, tunable passive antennas often only provide a poor tuning capability, so that, at the end of the process "delivering antenna control signals to the tunable passive antennas" (83), the impedance matrix seen by the output ports typically only coarsely approximates the specified impedance matrix.

Figure 7:
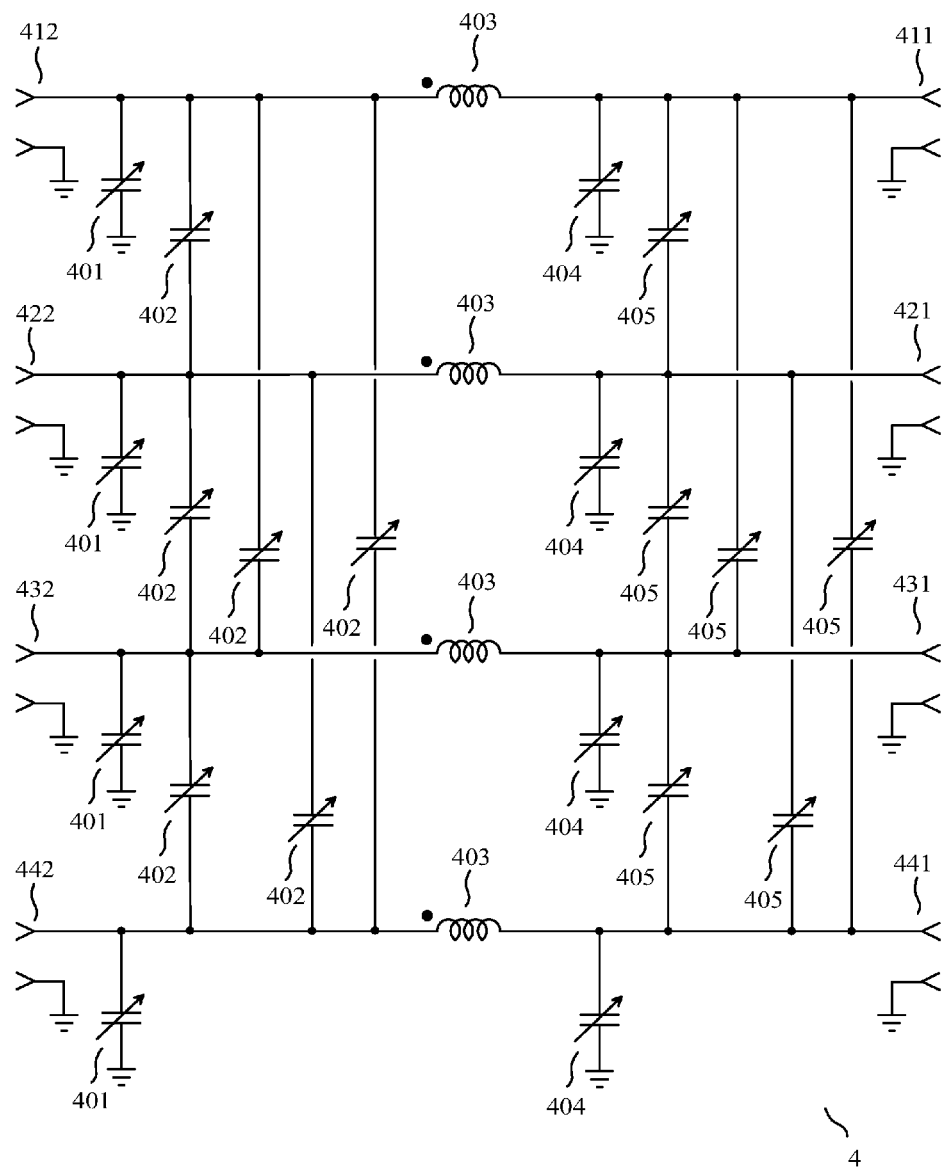
FIG. 7 shows a schematic diagram of a multiple-input-port and multiple-output-port tuning unit having 4 input ports and 4 output ports, which may be used in the apparatus for radio communication shown in FIG. 3 (seventh embodiment)

We have represented in FIG. 7 the multiple-input-port and multiple-output-port tuning unit (4) used in this seventh embodiment. This multiple-input-port and multiple-output-port tuning unit comprises:

n=4 output ports (412) (422) (432) (442);
m=4 input ports (411) (421) (431) (441);
n adjustable impedance devices of the tuning unit (401) each presenting a negative reactance and each being coupled in parallel with one of the output ports;
n(n−1)/2 adjustable impedance devices of the tuning unit (402) each presenting a negative reactance and each having a first terminal coupled to one of the output ports and a second terminal coupled to one of the output ports which is different from the output port to which the first terminal is coupled;
n=m windings (403) each having a first terminal coupled to one of the output ports and a second terminal coupled to one of the input ports;
m adjustable impedance devices of the tuning unit (404) each presenting a negative reactance and each being coupled in parallel with one of the input ports; and
m(m−1)/2 adjustable impedance devices of the tuning unit (405) each presenting a negative reactance and each having a first terminal coupled to one of the input ports and a second terminal coupled to one of the input ports which is different from the input port to which the first terminal is coupled.

It is possible that mutual induction exists between the windings (403). In this case, the inductance matrix of the windings is not a diagonal matrix.

All adjustable impedance devices of the tuning unit (401) (402) (404) (405) are adjustable by electrical means, but the circuits and the control links needed to determine the reactance of each of the adjustable impedance devices of the tuning unit are not shown in FIG. 7. In this seventh embodiment, we have n=m and we use p=m(m+1)=20 adjustable impedance devices of the tuning unit.

The specialist knows that the characteristics of the multiple-input-port and multiple-output-port tuning unit shown in FIG. 7 have been investigated in: the article of F. Broydé and E. Clavelier, entitled "A New Multiple-Antenna-Port and Multiple-User-Port Antenna Tuner", published in *Proc. 2015 IEEE Radio & Wireless Week, RWW 2015*, at the pages 41 to 43, in January 2015; said article entitled "Some Properties of Multiple-Antenna-Port and Multiple-User-Port Antenna Tuners"; said article entitled "Two Multiple-Antenna-Port and Multiple-User-Port Antenna Tuners"; and in the article of F. Broydé and E. Clavelier entitled "A Tuning Computation Technique for a Multiple-Antenna-Port and Multiple-User-Port Antenna Tuner", published in *International Journal of Antennas and Propagation*, in 2016.

The specialist understands that the multiple-input-port and multiple-output-port tuning unit is such that, at the given frequency, there exists a diagonal impedance matrix referred to as "the given diagonal impedance matrix", the given diagonal impedance matrix being such that, if an impedance matrix seen by the output ports is equal to the given diagonal impedance matrix, then: the reactance of any one of the adjustable impedance devices of the tuning unit has an influence on the impedance matrix presented by the input ports; and the reactance of at least one of the adjustable impedance devices of the tuning unit has an influence on at least one non-diagonal entry of the impedance matrix presented by the input ports.

At the beginning of the process "delivering tuning control signals to the tuning unit" (84), the transmission and signal processing unit again estimates the q real quantities depending on an impedance matrix seen by the output ports, to obtain new values of said q real quantities depending on an impedance matrix seen by the output ports, said new values being representative of an impedance matrix seen by the output ports immediately after the end of the process "delivering antenna control signals to the tunable passive antennas" (83). The process "delivering tuning control signals to the tuning unit" (84) uses an algorithm to determine the one or more tuning unit adjustment instructions. The algorithm uses the selected frequency and the q real quantities depending on an impedance matrix seen by the output ports (more precisely, said new values of said q real quantities depending on an impedance matrix seen by the output ports). A first possible algorithm may for instance use the formulas shown in Section VI of said article entitled "Some Properties of Multiple-Antenna-Port and Multiple-User-Port Antenna Tuners". This first possible algorithm does not take the losses of the multiple-input-port and multiple-output-port tuning unit into account. A second possible algorithm may for instance use the iterative computation technique presented in Section 4 of said article entitled "A Tuning Computation Technique for a Multiple-Antenna-Port and Multiple-User-Port Antenna Tuner". This second possible algorithm is more accurate than the first possible algorithm, because it takes the losses in the multiple-input-port and multiple-output-port tuning unit into account. The specialist knows how to write such an algorithm. We see that the algorithm can be such that the adjustment of the multiple-input-port and multiple-output-port tuning unit is always optimal or almost optimal, in spite of the losses in the multiple-input-port and multiple-output-port tuning unit.

Consequently, this embodiment is a solution to the problem of automatically adjusting the plurality of tunable passive antennas coupled to a radio transmitter used for MIMO wireless communication, in a manner that provides: a good tuning capability, by utilizing a multiple-input-port and multiple-output-port tuning unit; and an adjustment of the multiple-input-port and multiple-output-port tuning unit which is close to an optimal adjustment, when its losses are not very small. Moreover, this embodiment provides a much broader tuning range than an automatic tuning system which would comprise the multiple-input-port and multiple-output-port tuning unit shown in FIG. 7, but no tunable passive antenna.

The reactance of an adjustable impedance device may depend on the ambient temperature, for some types of adjustable impedance devices. If such a type of adjustable impedance device is used in one or more of the tunable passive antennas, and/or in the multiple-input-port and multiple-output-port tuning unit, it is possible that at least one of the one or more antenna control signals is determined as a function of at least one of the one or more antenna adjustment instructions and as a function of one or more temperatures, and/or it is possible that at least one of the one or more tuning control signals is determined as a function of at least one of the one or more tuning unit adjustment instructions and as a function of one or more temperatures, to compensate the effect of temperature. If such a type of adjustable impedance device is used in one or more of the tunable passive antennas, and/or in the multiple-input-port and multiple-output-port tuning unit, it is also possible that one or more temperatures are taken into account to obtain at least one of the one or more antenna adjustment instructions and/or to obtain at least one of the one or more tuning unit adjustment instructions, to compensate the effect of temperature. In this case, it is for instance possible that the transmission and signal processing unit delivers the one or more tuning unit adjustment instructions as a function of said at least m of said q real quantities depending on an impedance matrix seen by the output ports, and as a function of said one or more temperatures.

Eighth Embodiment

The eighth embodiment of a device of the invention, given by way of non-limiting example, also corresponds to the apparatus for radio communication shown in FIG. 3, and all explanations provided for the first embodiment are applicable to this eighth embodiment.

Figure 8:
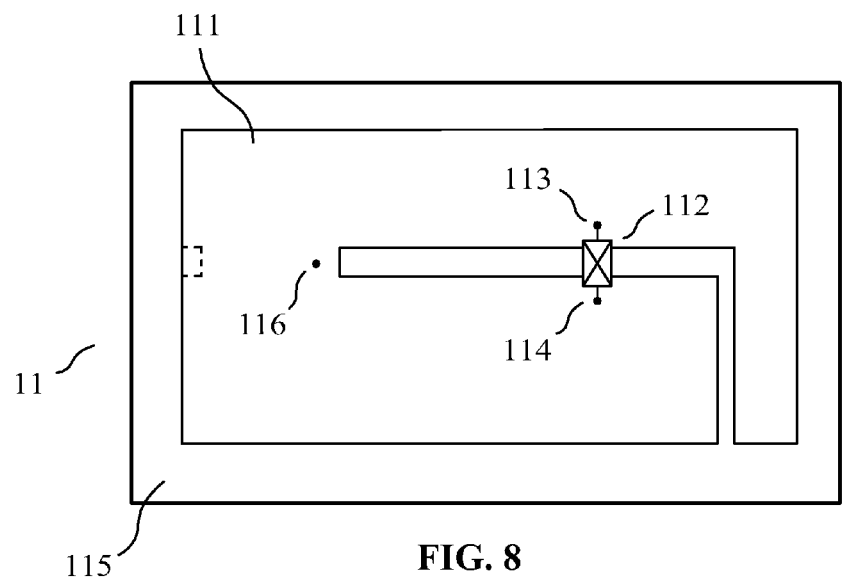
FIG. 8 shows a first tunable passive antenna, which comprises a single antenna control device (eighth embodiment)

A tunable passive antenna (11) used in this eighth embodiment is shown in FIG. 8. The other tunable passive antennas (12) (13) (14) used in this eighth embodiment may be identical to the tunable passive antenna shown in FIG. 8. The tunable passive antenna shown in FIG. 8 comprises a planar metallic structure (111) built above a ground plane (115), the signal port of the antenna (116) where an unbalanced feeder is connected to the metallic structure, and an antenna control device (112). The metallic structure is slotted and such that, if the antenna control device was not present, the tunable passive antenna would be an example of a planar inverted-F antenna, also referred to as PIFA. The antenna control device is a MEMS switch comprising a first terminal (113) connected to the metallic structure (111) at a first side of the slot, and a second terminal (114) connected to the metallic structure (111) at a second side of the slot. The specialist understands that the self-impedance of the tunable passive antenna, in a given test configuration and at the given frequency, is a characteristic of the tunable passive antenna which may be varied using said antenna control device, so that this characteristic is controlled by utilizing said antenna control device. The state of the MEMS switch (on or off) is a parameter of the antenna control device which has an influence on said characteristic. This parameter of the antenna control device is adjustable by electrical means, but the circuits and the control links needed to determine the state of the antenna control device are not shown in FIG. 8.

Ninth Embodiment

The ninth embodiment of an apparatus of the invention, given by way of non-limiting example, also corresponds to the apparatus for radio communication shown in FIG. 3, and all explanations provided for the first embodiment are applicable to this ninth embodiment.

Figure 9:
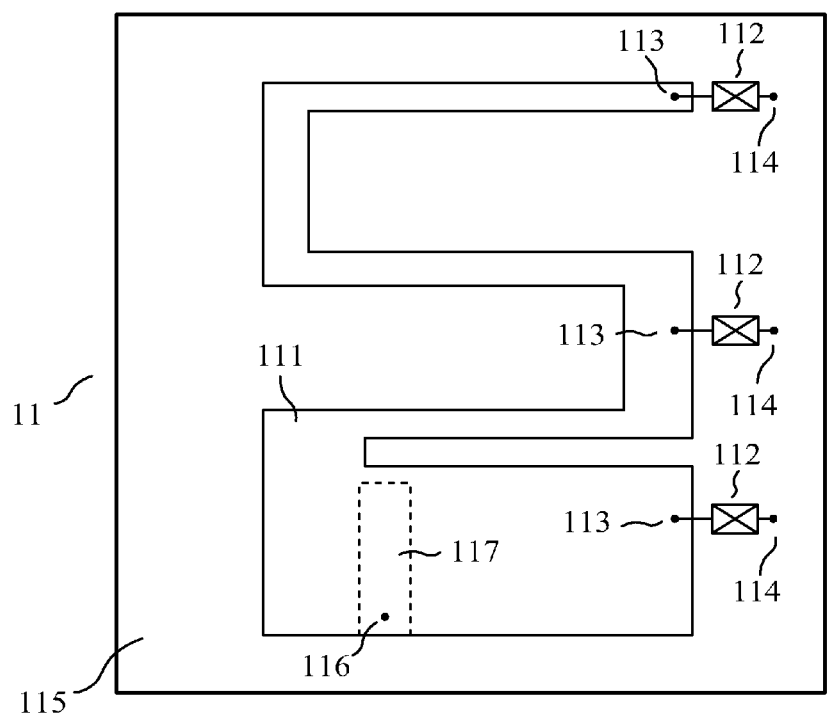
FIG. 9 shows a second tunable passive antenna, which comprises three antenna control devices (ninth embodiment)

A tunable passive antenna (11) used in this ninth embodiment is shown in FIG. 9. The other tunable passive antennas (12) (13) (14) used in this ninth embodiment may be identical to the tunable passive antenna shown in FIG. 8 or to the tunable passive antenna shown in FIG. 9. The tunable passive antenna shown in FIG. 9 comprises a planar metallic structure (111) built above a ground plane (115), the signal port of the antenna (116) where an unbalanced feeder is connected to a metallic strip (117) lying between the ground plane and the metallic structure, and three antenna control devices (112). Each of the antenna control devices is an adjustable impedance device having a reactance at the given frequency, comprising a first terminal (113) connected to the metallic structure (111), and a second terminal (114) connected to the ground plane (115). The specialist understands that the self-impedance of the tunable passive antenna, in a given test configuration and at the given frequency, is a characteristic of the tunable passive antenna which may be varied using said antenna control devices, so that this characteristic is controlled by utilizing said antenna control devices. Each of the antenna control devices has a reactance at the given frequency, this reactance being a parameter of said each of the antenna control devices, this parameter having an influence on said characteristic. This parameter of each of the antenna control devices is adjustable by electrical means, but the circuits and the control links needed to determine the reactance of each of the antenna control devices are not shown in FIG. 9.

Tenth Embodiment

The tenth embodiment of an apparatus of the invention, given by way of non-limiting example, also corresponds to the apparatus for radio communication shown in FIG. 3, and all explanations provided for the first embodiment are applicable to this tenth embodiment.

Figure 10:
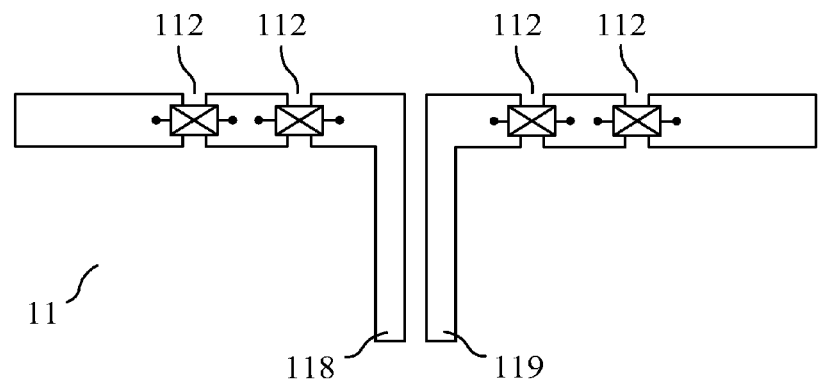
FIG. 10 shows a third tunable passive antenna, which comprises four antenna control devices (tenth embodiment)

A tunable passive antenna (11) used in this tenth embodiment is shown in FIG. 10. The other tunable passive antennas (12) (13) (14) used in this tenth embodiment may be identical to the tunable passive antenna shown in FIG. 8, or to the tunable passive antenna shown in FIG. 9, or to the tunable passive antenna shown in FIG. 10. The tunable passive antenna (11) shown in FIG. 10 has a plane of symmetry orthogonal to the drawing. Thus, the tunable passive antenna has a first half-antenna, on the left in FIG. 10, and a second half-antenna, on the right in FIG. 10. The signal port of the antenna comprises a first terminal (118) where a first conductor of a balanced feeder is connected to the first half-antenna, and a second terminal (119) where a second conductor of the balanced feeder is connected to the second half-antenna. Each half-antenna includes three segments and two antenna control devices (112). Each of the antenna control devices is an adjustable impedance device having a reactance at the given frequency, comprising a first terminal connected to a segment of an half-antenna, and a second terminal connected to another segment of this half-antenna. The specialist understands that the self-impedance of the tunable passive antenna, in a given test configuration and at the given frequency, is a characteristic of the tunable passive antenna which may be varied using said antenna control devices, so that this characteristic is controlled by utilizing said antenna control devices. Each of the antenna control devices has a reactance at the given frequency, this reactance being a parameter of said each of the antenna control devices, this parameter having an influence on said characteristic. This parameter of each of the antenna control devices is adjustable by electrical means, but the circuits and the control links needed to determine the reactance of each of the antenna control devices are not shown in FIG. 10.

Eleventh Embodiment

The eleventh embodiment of an apparatus of the invention, given by way of non-limiting example, also corresponds to the apparatus for radio communication shown in FIG. 3, and all explanations provided for the first embodiment are applicable to this eleventh embodiment.

Figure 11:
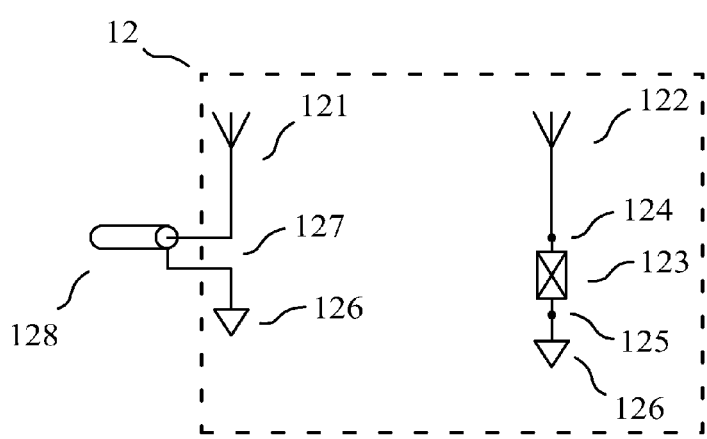
FIG. 11 shows a fourth tunable passive antenna, which comprises a single antenna control device (eleventh embodiment)

A tunable passive antenna (12) used in this eleventh embodiment is shown in FIG. 11. The other tunable passive antennas (11) (13) (14) used in this eleventh embodiment may be identical to the tunable passive antenna shown in FIG. 11. The tunable passive antenna (12) shown in FIG. 11 comprises a main antenna (121), a parasitic antenna (122), the signal port of the antenna (127) where an unbalanced feeder (128) is connected to the main antenna and to ground (126), and an antenna control device (123). The antenna control device is an adjustable impedance device having a reactance at the given frequency, comprising a first terminal (124) connected to the parasitic antenna (122), and a second terminal (125) connected to ground (126). The specialist understands that the directivity pattern of the tunable passive antenna (12), in a given test configuration and at the given frequency, is a characteristic of the tunable passive antenna which may be varied using said antenna control device, so that this characteristic is controlled by utilizing said antenna control device. The reactance of the antenna control device at the given frequency is a parameter of said antenna control device which has an influence on said characteristic. This parameter of the antenna control device is adjustable by electrical means, but the circuits and the control links needed to determine the reactance of the antenna control device are not shown in FIG. 11.

However, the specialist understands that this parameter also has an influence on the self-impedance of the tunable passive antenna, so that the self-impedance of the tunable passive antenna, in a given test configuration and at the given frequency, is also a characteristic of the tunable passive antenna which may be varied using said antenna control device. The tunable passive antenna (12) could also comprise other parasitic antennas each coupled to an antenna control device.

Twelfth Embodiment

Figure 12:
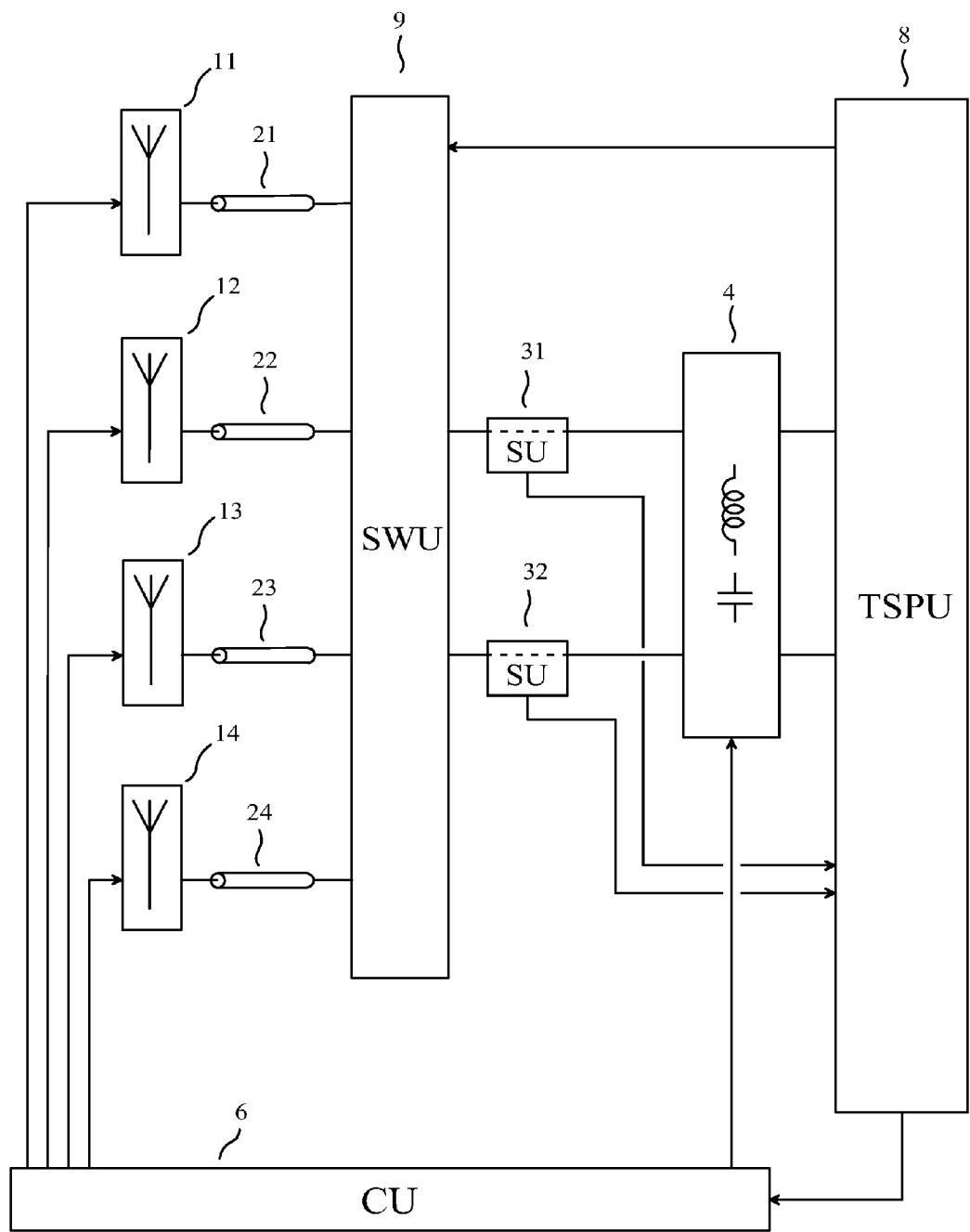
FIG. 12 shows a block diagram of an apparatus for radio communication of the invention (twelfth embodiment).

As a twelfth embodiment of a device of the invention, given by way of non-limiting example, we have represented in FIG. 12 the block diagram of an apparatus for radio communication comprising:

N=4 tunable passive antennas (11) (12) (13) (14), each of the tunable passive antennas comprising at least one antenna control device, said at least one antenna control device having at least one parameter having an effect on one or more characteristics of said each of the tunable passive antennas, said at least one parameter being adjustable by electrical means;

a switching unit (9), the switching unit comprising N antenna ports each coupled to one and only one of the tunable passive antennas through a feeder (21) (22) (23) (24), the switching unit comprising n=2 antenna array ports, the switching unit operating in an active configuration determined by one or more "configuration instructions", the active configuration being one of a plurality of allowed configurations, the switching unit providing, in any one of the allowed configurations, for signals in a given frequency band and for any one of the antenna array ports, a bidirectional path between said any one of the antenna array ports and one and only one of the antenna ports;

a multiple-input-port and multiple-output-port tuning unit (4) having m=2 input ports and n output ports, the apparatus for radio communication allowing, at a given frequency in the given frequency band, a transfer of power from any one of them input ports to an electromagnetic field radiated by the tunable passive antennas, the multiple-input-port and multiple-output-port tuning unit comprising p adjustable impedance devices, where p is an integer greater than or equal to m, the p adjustable impedance devices being referred to as "the adjustable impedance devices of the tuning unit" and being such that, at the given frequency, each of the adjustable impedance devices of the tuning unit has a reactance, the reactance of any one of the adjustable impedance devices of the tuning unit being adjustable by electrical means;

n sensing units (31) (32), each of the sensing units delivering one or more "sensing unit output signals", each of the sensing unit output signals being mainly determined by one or more electrical variables sensed (or measured) at one of the output ports;

a transmission and signal processing unit (8), the transmission and signal processing unit delivering the one or more configuration instructions, the transmission and signal processing unit applying m excitations to the m input ports, one and only one of the excitations being applied to each of the input ports, the transmission and signal processing unit estimating q real quantities depending on an impedance matrix seen by the output ports, where q is an integer greater than or equal to m, by utilizing the sensing unit output signals, the transmission and signal processing unit delivering one or more "antenna adjustment instructions", the one or more antenna adjustment instructions being determined as a function of one or more of said q real quantities depending on an impedance matrix seen by the output ports, the transmission and signal processing unit delivering one or more "tuning unit adjustment instructions", the one or more tuning unit adjustment instructions being determined as a function of at least m of said q real quantities depending on an impedance matrix seen by the output ports; and a control unit (6), the control unit delivering one or more "antenna control signals" to the tunable passive antennas, each of the one or more antenna control signals being determined as a function of at least one of the one or more antenna adjustment instructions, each said at least one parameter of each said at least one antenna control device of each of the tunable passive antennas being determined by at least one of the one or more antenna control signals, the control unit delivering one or more "tuning control signals" to the multiple-input-port and multiple-output-port tuning unit, each of the one or more tuning control signals being determined as a function of at least one of the one or more tuning unit adjustment instructions, the reactance of each of the adjustable impedance devices of the tuning unit being determined by at least one of the one or more tuning control signals.

In the previous sentence, we note that: the requirement "the one or more antenna adjustment instructions being determined as a function of one or more of said q real quantities depending on an impedance matrix seen by the output ports" does not mean that each of the one or more antenna adjustment instructions is determined as a function of one or more of said q real quantities depending on an impedance matrix seen by the output ports; and the requirement "the one or more tuning unit adjustment instructions being determined as a function of at least m of said q real quantities depending on an impedance matrix seen by the output ports" does not mean that each of the one or more tuning unit adjustment instructions is determined as a function of at least m of said q real quantities depending on an impedance matrix seen by the output ports.

The switching unit operates (or is used) in an active configuration determined by the one or more configuration instructions, the active configuration being one of a plurality of allowed configurations, the switching unit providing, in any one of the allowed configurations, for signals in the given frequency band and for any one of the antenna array ports, a path between said any one of the antenna array ports and one of the antenna ports. Thus, the switching unit operates in an active configuration which is one of the allowed configurations, and each allowed configuration corresponds to a selection of n antenna ports among the N antenna ports. It is also possible to say that the switching unit operates in an active configuration corresponding to a selection of n antenna ports among the N antenna ports.

Each allowed configuration corresponds to a selection of n antenna ports among the N antenna ports, the switching unit providing, for signals in the given frequency band and for any one of the antenna array ports, a path between said any one of the antenna array ports and one of the selected antenna ports. This path may preferably be a low loss path for signals in the given frequency band. The specialist understands that a suitable switching unit may comprise one or more electrically controlled switches and/or change-over switches (where "electrically controlled" means "controlled by electrical means"). In this case, one or more of said electrically controlled switches and/or change-over switches may for instance be an electro-mechanical relay, or a microelectromechanical switch, or a circuit using one or more PIN diodes and/or one or more insulated-gate field-effect transistors as switching devices.

In this twelfth embodiment, it is not possible to say that, for each of the tunable passive antennas, the signal port of the antenna is coupled, directly or indirectly, to one and only one of the output ports. However, in this twelfth embodiment, each of the n output ports is indirectly coupled to one and only one of the N tunable passive antennas. Or, more precisely, each of the n output ports is indirectly coupled to the signal port of one and only one of the N tunable passive antennas, through one and only one of the sensing units, the switching unit, and one and only one of the feeders.

The apparatus for radio communication is a radio transmitter or a radio transceiver, so that the transmission and signal processing unit (8) also performs functions which have not been mentioned above, and which are well known to specialists. The apparatus for radio communication uses simultaneously, in the given frequency band, n tunable passive antennas among the N tunable passive antennas, for MIMO radio emission and/or for MIMO radio reception. The given frequency band only contains frequencies greater than or equal to 300 MHz.

For instance, each of the one or more configuration instructions may be determined as a function of:

one or more localization variables, each of the one or more localization variables depending on a distance between a part of a human body and a zone of the apparatus for radio communication;

a frequency used for radio communication with the tunable passive antennas;

one or more additional variables, each of the additional variables lying in a set of additional variables, the elements of the set of additional variables comprising: communication type variables which indicate whether a radio communication session is a voice communication session, a data communication session or another type of communication session; a speakerphone mode activation indicator; a speaker activation indicator; variables obtained using one or more accelerometers; user identity variables which depend on the identity of the current user; reception quality variables; and emission quality variables.

It is possible that at least one of the one or more localization variables is an output of a sensor responsive to a pressure exerted by a part of a human body. Thus, it is possible that at least one of the one or more localization variables is the output of a circuit comprising a switch using a single pressure non-locking mechanical system, the state of which changes while a sufficient pressure is exerted by a part of a human body. It is also possible that at least one of the one or more localization variables is the output of a circuit comprising another type of electromechanical sensor responsive to a pressure exerted by a part of a human body, for instance a microelectromechanical sensor (MEMS sensor).

It is possible that at least one of the one or more localization variables is an output of a proximity sensor, such as a proximity sensor dedicated to the detection of a human body. Such a proximity sensor may for instance be a capacitive proximity sensor, or an infrared proximity sensor using reflected light intensity measurements, or an infrared proximity sensor using time-of-flight measurements, which are well known to specialists.

It is possible that the set of the possible values of at least one of the one or more localization variables is a finite set. It is possible that at least one of the one or more localization variables is a binary variable, that is to say such that the set of the possible values of said at least one of the one or more localization variables has exactly two elements. For instance, a capacitive proximity sensor dedicated to the detection of a human body (for instance the device SX9300 of Semtech) can be used to obtain a binary variable, which indicates whether or not a human body has been detected near a zone of the apparatus for radio communication. It is possible that the set of the possible values of any one of the one or more localization variables is a finite set. However, it is possible that the set of the possible values of at least one of the one or more localization variables is an infinite set, and it is possible that the set of the possible values of at least one of the one or more localization variables is a continuous set.

It is possible that the set of the possible values of at least one of the one or more localization variables has at least three elements. For instance, an infrared proximity sensor using time-of-flight measurements and dedicated to the assessment of the distance to a human body (for instance the device VL6180 of STMicroelectronics) can be used to obtain a localization variable such that the set of the possible values of the localization variable has three or more elements, one of the values meaning that no human body has been detected, each of the other values corresponding to a different distance between a zone of the apparatus for radio communication and the nearest detected part of a human body. It is possible that the set of the possible values of any one of the one or more localization variables has at least three elements.

It is possible that at least one of the one or more localization variables is an output of a sensor which is not dedicated to human detection. For instance, it is possible that at least one of the one or more localization variables is determined by a change of state of a switch of a keypad or keyboard, which is indicative of the position of a human finger. For instance, it is possible that at least one of the one or more localization variables is determined by a change of state of an output of a touchscreen, which is indicative of the position of a human finger. Such a touchscreen may use any one of the available technologies, such as a resistive touchscreen, a capacitive touchscreen or a surface acoustic wave touchscreen, etc.

It is said above that each of the one or more localization variables depends on the distance between a part of a human body and a zone of the apparatus for radio communication. This must be interpreted as meaning: each of the one or more localization variables is such that there exists at least one configuration in which the distance between a part of a human body and a zone of the apparatus for radio communication has an effect on said each of the one or more localization variables. However, it is possible that there exist one or more configurations in which the distance between a part of a human body and a zone of the apparatus for radio communication has no effect on said each of the one or more localization variables. For instance, the distance between a part of a human body and a zone of the apparatus for radio communication has no effect on a switch, in a configuration in which no force is directly or indirectly exerted by the human body on the switch. For instance, the distance between a part of a human body and a zone of the apparatus for radio communication has no effect on a proximity sensor if the human body is out of the proximity sensor's range.

The elements of said set of additional variables may further comprise one or more variables which are different from the localization variables and which characterize the grip with which a user is holding the apparatus for radio communication.

Each of the one or more configuration instructions may for instance be determined using a lookup table.

Each of the one or more configuration instructions may be of any type of digital message. Each of the one or more antenna adjustment instructions and each of the one or more tuning unit adjustment instructions may be of any type of digital message. The one or more configuration instructions, the one or more antenna adjustment instructions and the one or more tuning unit adjustment instructions are delivered during several adjustment sequences. The transmission and signal processing unit begins an adjustment sequence when one or more configuration instructions are delivered. The transmission and signal processing unit ends the adjustment sequence when the last tuning unit adjustment instruction of the adjustment sequence has been delivered. The duration of an adjustment sequence is less than 100 microseconds.

In order to respond to variations in the electromagnetic characteristics of the volume surrounding the tunable passive antennas and/or in the frequency of operation, adjustment sequences may take place repeatedly. For instance, a new adjustment sequence may start periodically, for instance every 10 milliseconds.

INDICATIONS ON INDUSTRIAL APPLICATIONS

The method of the invention is suitable for optimally and automatically adjusting a plurality of tunable passive antennas and a multiple-input-port and multiple-output-port tuning unit. The apparatus for radio communication of the invention can optimally and automatically adjust its tunable passive antennas and its multiple-input-port and multiple-output-port tuning unit.

All embodiments described above comprise N=4 tunable passive antennas, but this is not at all a characteristic of the invention. In the multiple-input-port and multiple-output-port tuning unit used in the sixth embodiment, shown in FIG. 5, and in the multiple-input-port and multiple-output-port tuning unit used in the seventh embodiment, shown in FIG. 7, the adjustable impedance devices of the tuning unit each present a negative reactance, but this is not at all a characteristic of the invention.

The apparatus for radio communication of the invention may for instance be a radio transmitter using a plurality of antennas simultaneously, or a radio transceiver using a plurality of antennas simultaneously. Thus, the method and the apparatus for radio communication of the invention are suitable for MIMO radio communication.

The method and the apparatus for radio communication of the invention provide the best possible characteristics using very close tunable passive antennas, hence presenting a strong interaction between them. The invention is therefore particularly suitable for mobile radio transmitters and transceivers, for instance those used in portable radiotelephones or portable computers.

The method and the apparatus for radio communication of the invention provide the best possible characteristics using a very large number of tunable passive antennas in a given volume, hence presenting a strong interaction between them. The invention is therefore particularly suitable for high-performance radio transmitters and transceivers, for instance those used in the fixed stations of cellular radiotelephony networks.

The invention claimed is:

1. A method for automatically adjusting N tunable passive antennas and a multiple-input-port and multiple-output-port tuning unit, where N is an integer greater than or equal to 2, the multiple-input-port and multiple-output-port tuning unit having m input ports and n output ports, where m and n are each an integer greater than or equal to 2, the tunable passive antennas and the multiple-input-port and multiple-output-port tuning unit being parts of an apparatus for radio communication, the apparatus for radio communication allowing, at a given frequency, a transfer of power from the m input ports to an electromagnetic field radiated by the tunable passive antennas, the method comprising the steps of:

applying m excitations to the m input ports, one and only one of the excitations being applied to each of the input ports;

estimating q real quantities depending on an impedance matrix seen by the output ports, where q is an integer greater than or equal to m, by utilizing said m excitations;

generating one or more antenna control signals, as a function of one or more of said q real quantities depending on an impedance matrix seen by the output ports, each of the tunable passive antennas comprising at least one antenna control device, said at least one antenna control device having at least one parameter having an effect on one or more characteristics of said each of the tunable passive antennas, said at least one parameter being adjustable by electrical means, said at least one parameter being mainly determined by at least one of the one or more antenna control signals; and generating one or more tuning control signals, as a function of at least m of said q real quantities depending on an impedance matrix seen by the output ports, the multiple-input-port and multiple-output-port tuning unit comprising p adjustable impedance devices, where p is an integer greater than or equal to m, the p adjustable impedance devices being referred to as the adjustable impedance devices of the tuning unit and being such that, at the given frequency, each of the adjustable impedance devices of the tuning unit has a reactance, the reactance of any one of the adjustable impedance devices of the tuning unit being adjustable by electrical means, the reactance of any one of the adjustable impedance devices of the tuning unit being mainly determined by at least one of the one or more tuning control signals.

2. The method of claim 1, wherein them excitations are applied successively to the input ports.

3. The method of claim 1, wherein each of the excitations has one and only one complex envelope, the m complex envelopes being linearly independent in the set of complex functions of one real variable, regarded as a vector space over the field of complex numbers.

4. The method of claim 3, wherein the m excitations are not applied successively to the input ports.

5. The method of claim 3, wherein two or more of the excitations are applied simultaneously to the input ports.

6. The method of claim 1, wherein n=m, and wherein the multiple-input-port and multiple-output-port tuning unit is composed of n single-input-port and single-output-port tuning units each comprising one or more of said adjustable impedance devices of the tuning unit.

7. The method of claim 1, wherein the multiple-input-port and multiple-output-port tuning unit is such that, at the given frequency, there exists a diagonal impedance matrix referred to as the given diagonal impedance matrix, the given diagonal impedance matrix being such that, if an impedance matrix seen by the output ports is equal to the given diagonal impedance matrix, then the reactance of any one of the adjustable impedance devices of the tuning unit has an influence on an impedance matrix presented by the input ports.

8. The method of claim 7, wherein the multiple-input-port and multiple-output-port tuning unit is such that, at the given frequency, if the impedance matrix seen by the output ports is equal to the given diagonal impedance matrix, then the reactance of at least one of the adjustable impedance devices of the tuning unit has an influence on at least one non-diagonal entry of the impedance matrix presented by the input ports.

9. An apparatus for radio communication comprising:

N tunable passive antennas, where N is an integer greater than or equal to 2, each of the tunable passive antennas comprising at least one antenna control device, said at least one antenna control device having at least one parameter having an effect on one or more characteristics of said each of the tunable passive antennas, said at least one parameter being adjustable by electrical means;

a multiple-input-port and multiple-output-port tuning unit having m input ports and n output ports, where m and n are each an integer greater than or equal to 2, the apparatus for radio communication allowing, at a given frequency, a transfer of power from the m input ports to an electromagnetic field radiated by the tunable passive antennas, the multiple-input-port and multiple-output-port tuning unit comprising p adjustable impedance devices, where p is an integer greater than or equal to m, the p adjustable impedance devices being referred to as the adjustable impedance devices of the tuning unit and being such that, at the given frequency, each of the adjustable impedance devices of the tuning unit has a reactance, the reactance of any one of the adjustable impedance devices of the tuning unit being adjustable by electrical means;

n sensing units, each of the sensing units delivering one or more sensing unit output signals, each of the sensing unit output signals being mainly determined by one or more electrical variables;

a transmission and signal processing unit, the transmission and signal processing unit applying m excitations to the m input ports, one and only one of the excitations being applied to each of the input ports, the transmission and signal processing unit estimating q real quantities depending on an impedance matrix seen by the output ports, where q is an integer greater than or equal to m, by utilizing the sensing unit output signals, the transmission and signal processing unit delivering one or more antenna adjustment instructions, the one or more antenna adjustment instructions being determined as a function of one or more of said q real quantities depending on an impedance matrix seen by the output ports, the transmission and signal processing unit delivering one or more tuning unit adjustment instructions, the one or more tuning unit adjustment instructions being determined as a function of at least m of said q real quantities depending on an impedance matrix seen by the output ports; and a control unit, the control unit delivering one or more antenna control signals to the tunable passive antennas, each of the one or more antenna control signals being determined as a function of at least one of the one or more antenna adjustment instructions, each said at least one parameter of each said at least one antenna control device of each of the tunable passive antennas being mainly determined by at least one of the one or more antenna control signals, the control unit delivering one or more tuning control signals to the multiple-input-port and multiple-output-port tuning unit, each of the one or more tuning control signals being determined as a function of at least one of the one or more tuning unit adjustment instructions, the reactance of each of the adjustable impedance devices of the tuning unit being mainly determined by at least one of the one or more tuning control signals.

10. The apparatus for radio communication of claim 9, wherein the m excitations are applied successively to the input ports.

11. The apparatus for radio communication of claim 9, wherein each of the excitations has one and only one complex envelope, the m complex envelopes being linearly independent in the set of complex functions of one real variable, regarded as a vector space over the field of complex numbers.

12. The apparatus for radio communication of claim 11, wherein the m excitations are not applied successively to the input ports.

13. The apparatus for radio communication of claim 11, wherein two or more of the excitations are applied simultaneously to the input ports.

14. The apparatus for radio communication of claim 9, wherein the sensing unit output signals delivered by each of the sensing units comprise: a first sensing unit output signal proportional to a first electrical variable, the first electrical variable being a voltage across one of the output ports; and a second sensing unit output signal proportional to a second electrical variable, the second electrical variable being a current flowing out of said one of the output ports.

15. The apparatus for radio communication of claim 9, wherein the sensing unit output signals delivered by each of the sensing units comprise: a first sensing unit output signal proportional to a first electrical variable, the first electrical variable being an incident voltage at one of the output ports; and a second sensing unit output signal proportional to a second electrical variable, the second electrical variable being a reflected voltage at said one of the output ports.

16. The apparatus for radio communication of claim 9, wherein n=m, and wherein the multiple-input-port and multiple-output-port tuning unit is composed of n single-input-port and single-output-port tuning units each comprising one or more of said adjustable impedance devices of the tuning unit.

17. The apparatus for radio communication of claim 9, wherein the multiple-input-port and multiple-output-port tuning unit is such that, at the given frequency, there exists a diagonal impedance matrix referred to as the given diagonal impedance matrix, the given diagonal impedance matrix being such that, if an impedance matrix seen by the output ports is equal to the given diagonal impedance matrix, then the reactance of any one of the adjustable impedance devices of the tuning unit has an influence on an impedance matrix presented by the input ports.

18. The apparatus for radio communication of claim 17, wherein the multiple-input-port and multiple-output-port tuning unit is such that, at the given frequency, if the impedance matrix seen by the output ports is equal to the given diagonal impedance matrix, then the reactance of at least one of the adjustable impedance devices of the tuning unit has an influence on at least one non-diagonal entry of the impedance matrix presented by the input ports.

19. The apparatus for radio communication of claim 9, wherein the transmission and signal processing unit delivers the one or more tuning unit adjustment instructions as a function of said at least m of said q real quantities depending on an impedance matrix seen by the output ports, and as a function of one or more temperatures.

20. The apparatus for radio communication of claim 9, wherein at least one of the one or more tuning control signals is determined as a function of at least one of the one or more tuning unit adjustment instructions and as a function of one or more temperatures.

\* \* \* \* \*